(12) United States Patent
Takács et al.

(10) Patent No.: US 11,166,208 B2
(45) Date of Patent: Nov. 2, 2021

(54) METHODS AND SYSTEMS FOR USING AN UNMANNED AERIAL VEHICLE (UAV) FLIGHT PATH TO COORDINATE AN ENHANCED HANDOVER IN 3RD GENERATION PARTNERSHIP PROJECT (3GPP) NETWORKS

(71) Applicant: Telefonaktiebolaget LM Ericsson (publ), Stockholm (SE)

(72) Inventors: Attila Takács, San Jose, CA (US); Ravi Manghirmalani, Fremont, CA (US); Heikki Mahkonen, San Jose, CA (US); Yi-Pin Eric Wang, Fremont, CA (US); Xingqin Lin, San Jose, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/610,049

(22) PCT Filed: Dec. 11, 2017

(86) PCT No.: PCT/IB2017/057810
§ 371 (c)(1),
(2) Date: Oct. 31, 2019

(87) PCT Pub. No.: WO2018/203120
PCT Pub. Date: Nov. 8, 2018

(65) Prior Publication Data
US 2020/0120563 A1    Apr. 16, 2020

Related U.S. Application Data

(60) Provisional application No. 62/502,489, filed on May 5, 2017.

(51) Int. Cl.
*H04W 4/00*        (2018.01)
*H04W 36/00*       (2009.01)
(Continued)

(52) U.S. Cl.
CPC ...... *H04W 36/00835* (2018.08); *G08G 5/003* (2013.01); *H04B 7/18506* (2013.01); *H04W 16/18* (2013.01); *H04W 36/00837* (2018.08)

(58) Field of Classification Search
CPC ......... H04W 36/0083; H04W 36/0061; H04W 36/08; B64C 39/024; B64C 2201/146
See application file for complete search history.

(56) References Cited

U.S. PATENT DOCUMENTS 7,813,326 B1    10/2010  Kelm et al.
9,363,690 B1     6/2016  Singh et al.
(Continued)

FOREIGN PATENT DOCUMENTS

CN    101836478 A    9/2010
CN    104053195 A    9/2014
(Continued)

OTHER PUBLICATIONS

Wikipedia, "Global Positioning System", available online at <https://en.wikipedia.org/w/index.php?title=Global_Positioning_System&oldid=917890871>, Sep. 26, 2019, 36 pages.
(Continued)

*Primary Examiner* — Omoniyi Obayanju
(74) *Attorney, Agent, or Firm* — Nicholson De Vos Webster & Elliott LLP

(57) ABSTRACT

A method for managing an unmanned aerial vehicle (UAV) is described. The method may include receiving flight plan information describing a flight path of the UAV; generating one or more cell lists based on the flight plan information; and transmitting the one or more cell lists to a source cell in a wireless network in which the UAV is currently operating, wherein the one or more cell lists are used in a handover procedure between the source cell that the UAV is currently
(Continued)

connected to and a target cell that the UAV will connect to after completing the handover procedure.

21 Claims, 12 Drawing Sheets

(51) Int. Cl.
*G08G 5/00* (2006.01)
*H04B 7/185* (2006.01)
*H04W 16/18* (2009.01)

(56) References Cited

U.S. PATENT DOCUMENTS

| | | | |
|---|---|---|---|
| 9,412,278 | B1 | 8/2016 | Gong et al. |
| 9,467,922 | B1 | 10/2016 | Buchmueller et al. |
| 9,537,561 | B1* | 1/2017 | Kotecha ............... H04W 8/00 |
| 9,588,516 | B1 | 3/2017 | Gurel et al. |
| 9,609,288 | B1 | 3/2017 | Richman et al. |
| 9,709,409 | B2 | 7/2017 | Dave et al. |
| 2004/0156399 | A1 | 8/2004 | Eran |
| 2007/0284474 | A1 | 12/2007 | Olson et al. |
| 2010/0062774 | A1 | 3/2010 | Motegi et al. |
| 2010/0085236 | A1 | 4/2010 | Franceschini et al. |
| 2010/0153001 | A1 | 6/2010 | Bauchot et al. |
| 2010/0254346 | A1 | 10/2010 | Jain et al. |
| 2012/0225675 | A1 | 9/2012 | Nishida et al. |
| 2015/0038140 | A1* | 2/2015 | Kilpatrick, II ........ H04W 52/50 455/436 |
| 2015/0119043 | A1* | 4/2015 | Gopal ................... H04W 88/06 455/437 |
| 2015/0208300 | A1* | 7/2015 | McLaughlin ... H04W 36/00837 455/436 |
| 2015/0312813 | A1 | 10/2015 | Xu et al. |
| 2016/0065345 | A1 | 3/2016 | Kim et al. |
| 2016/0070265 | A1 | 3/2016 | Liu et al. |
| 2016/0125740 | A1 | 5/2016 | Pasko et al. |
| 2016/0140851 | A1 | 5/2016 | Levy et al. |
| 2016/0142944 | A1 | 5/2016 | Cao |
| 2016/0142994 | A1 | 5/2016 | Luo et al. |
| 2016/0161258 | A1 | 6/2016 | Magson et al. |
| 2016/0266579 | A1 | 9/2016 | Chen et al. |
| 2016/0284221 | A1 | 9/2016 | Hinkle et al. |
| 2016/0292403 | A1 | 10/2016 | Gong et al. |
| 2016/0300493 | A1 | 10/2016 | Ubhi et al. |
| 2016/0300495 | A1 | 10/2016 | Kantor et al. |
| 2016/0358187 | A1 | 12/2016 | Radocchia et al. |
| 2016/0363929 | A1 | 12/2016 | Clark et al. |
| 2016/0371985 | A1 | 12/2016 | Kotecha |
| 2016/0371987 | A1 | 12/2016 | Kotecha |
| 2016/0380692 | A1 | 12/2016 | Jalali et al. |
| 2017/0023939 | A1 | 1/2017 | Leonard et al. |
| 2017/0045884 | A1 | 2/2017 | Kablaoui |
| 2017/0092137 | A1 | 3/2017 | Hiebl |
| 2017/0124884 | A1 | 5/2017 | Shaw et al. |
| 2017/0142766 | A1 | 5/2017 | Kim |
| 2017/0150373 | A1 | 5/2017 | Brennan et al. |
| 2017/0168480 | A1 | 6/2017 | Wanstedt et al. |
| 2018/0086483 | A1 | 3/2018 | Priest et al. |
| 2018/0152510 | A1 | 5/2018 | Newton et al. |
| 2018/0247544 | A1* | 8/2018 | Mustafic .............. G08G 5/0039 |
| 2018/0279348 | A1 | 9/2018 | Huang et al. |
| 2019/0012923 | A1 | 1/2019 | Weisbrod et al. |
| 2019/0087576 | A1 | 3/2019 | Olson |
| 2019/0289505 | A1 | 9/2019 | Thomas et al. |
| 2019/0364492 | A1 | 11/2019 | Azizi et al. |
| 2020/0005651 | A1 | 1/2020 | Priest |
| 2020/0105149 | A1 | 4/2020 | Mahkonen et al. |
| 2020/0193844 | A1 | 6/2020 | Mahkonen et al. |

FOREIGN PATENT DOCUMENTS

| | | |
|---|---|---|
| CN | 105828345 A | 8/2016 |
| EP | 2175290 A1 | 4/2010 |
| EP | 2175290 B1 | 10/2013 |
| EP | 3029996 A1 | 6/2016 |
| EP | 3139516 A1 | 3/2017 |
| EP | 3349085 A1 | 7/2018 |
| JP | 2003-092545 A | 3/2003 |
| RU | 2595642 C1 | 8/2016 |
| RU | 2637838 C2 | 12/2017 |
| WO | 2011/100535 A1 | 8/2011 |
| WO | 2012/112097 A1 | 8/2012 |
| WO | 2015/114572 A1 | 8/2015 |
| WO | 2015/179439 A1 | 11/2015 |
| WO | 2016/154949 A1 | 10/2016 |
| WO | 2016/164892 A1 | 10/2016 |
| WO | 2016161637 A1 | 10/2016 |
| WO | 2016/190793 A1 | 12/2016 |
| WO | 2017/042403 A1 | 3/2017 |
| WO | 2017/048363 A1 | 3/2017 |
| WO | 2017/149160 A1 | 9/2017 |

OTHER PUBLICATIONS

3GPP TS 23.203 V12.6.0, 3rd Generation Partnership Project, Technical Specification Group Services and System Aspects, Policy and charging control architecture, (Release 12), Sep. 2014, 220 pages.
3GPP TS 23.203 V14.2.0, 3rd Generation Partnership Project, Technical Specification Group Services and System Aspects, Policy and charging control architecture, (Release 14), Dec. 2016, 256 pages.
3GPP TS 23.271 V14.0.0, 3rd Generation Partnership Project, Technical Specification Group Services and System Aspects, Functional stage 2 description of Location Services (LCS), (Release 14), Dec. 2016, 180 pages.
3GPP TS 23.401 V14.2.0, 3rd Generation Partnership Project, Technical Specification Group Services and System Aspects, General Packet Radio Service (GPRS) enhancements for Evolved Universal Terrestrial Radio Access Network (E-UTRAN) access, (Release 14), Dec. 2016, 385 pages.
3GPP TS 36.201 V14.0.0, 3rd Generation Partnership Project, Technical Specification Group Radio Access Network, Evolved Universal Terrestrial Radio Access (E-UTRA) LTE physical layer; General description, (Release 14), Sep. 2016, 15 pages.
3GPP TS 36.300 V14.1.0, 3rd Generation Partnership Project, Technical Specification Group Radio Access Network, Evolved Universal Terrestrial Radio Access (E-UTRA) and Evolved Universal Terrestrial Radio Access Network (E-UTRAN), Overall description, Stage 2, (Release 14), Dec. 2016, 317 pages.
3GPP TS 45.002 V14.0.0, 3rd Generation Partnership Project, Technical Specification Group Radio Access Network, GSM/EDGE Multiplexing and multiple access on the radio path, (Release 14), Dec. 2016, 142 pages.
Curran et al., "Location Based Predictive Handoff Algorithm for Mobile Networks," Advances in Intelligent IT: Active Media Technology, May 2006, pp. 86-91.
Federal Aviation Administration, Automatic Dependent Surveillance-Broadcast (ADS-B), 2019, 2 pages.
Forsberg, Providing Air Traffic Control Services for Small Unmanned Aircraft Through LTE, https://www.diva-portal.org/smash/get/diva2:1041494/FULLTEXT01.pdf, 2016, 90 pages.
GPS World, "uAvionix demonstrates dime-sized ADS-B for high-traffic drone operations", available online at <http://gpsworld.com/uavionix-demonstrates-dime-sized-ads-b-for-high-traffic-drone-operations>, retrieved on Apr. 4, 2017, 6 pages.
Guterres et al., "ADS-B Surveillance System Performance with Small UAS at Low Altitudes", available online at <https://www.mitre.org/sites/default/files/publications/16/4497-AIAA-2017-ADS-B.pdf>, 2017, 15 pages.
Huawei et al., "Mobility enhancement for Drones", 3GPP TSG-RAN WG2 Meeting #98, R2-1704997, 3rd Generation Partnership Project (3GPP), Hangzhou, China, May 14, 2017 (May 14, 2017), XP051275500, Retrieved from the Internet: URL:http://www.3gpp.org/ftp/Meetings_3GPP_SYNC/RAN2/Docs/.

(56) References Cited

OTHER PUBLICATIONS

Huawei et al., "Potential enhancements for drones", 3GPP TSG-RAN WG1 Meeting #89, R1-1707016, 3rd Generation Partnership Project (3GPP), Hangzhou, China, May 14, 2017 (May 14, 2017), XP051272246, Retrieved from the Internet: URL:http://www.3gpp.org/ftp/Meetings_3GPP_SYNC/RAN1/Docs/.
IEEE Std 802.11 (Trademark)-2012, Part 11: Wireless LAN Medium Access Control (MAC) and Physical Layer (PHY) Specifications, Mar. 2012, 2793 pages.
International Preliminary Report on Patentability, PCT App. No. PCT/IB2017/053444, dated Oct. 10, 2019, 9 pages.
International Preliminary Report on Patentability, PCT App. No. PCT/IB2017/053477, dated Oct. 10, 2019, 8 pages.
International Preliminary Report on Patentability, PCT App. No. PCT/IB2017/053641, dated Oct. 10, 2019, 8 pages.
International Preliminary Report on Patentability, PCT App. No. PCT/IB2017/054160, dated Oct. 16, 2019, 21 pages.
International Preliminary Report on Patentability, PCT App. No. PCT/IB2017/054252, dated Oct. 24, 2019, 8 pages.
International Preliminary Report on Patentability, PCT App. No. PCT/IB2017/057810, dated May 9, 2019, 13 pages.
International Preliminary Report on Patentability, PCT App. No. PCT/IB2017/057859, dated Oct. 10, 2019, 15 pages.
International Preliminary Report on Patentability, PCT App. No. PCT/IB2017/057860, dated Oct. 10, 2019, 14 pages.
International Search Report and Written Opinion for Application No. PCT/IB2017/053477, dated Dec. 15, 2017, 11 pages.
International Search Report and Written Opinion for Application No. PCT/IB2017/053641, dated Nov. 22, 2017, 11 pages.
International Search Report and Written Opinion for Application No. PCT/IB2017/054160, dated Mar. 13, 2018, 16 pages.
International Search Report and Written Opinion for Application No. PCT/IB2017/054252, dated Jan. 3, 2018, 11 pages.
International Search Report and Written Opinion for Application No. PCT/IB2017/057859, dated Jun. 12, 2018, 21 pages.
International Search Report and Written Opinion for Application No. PCT/IB2017/057860, dated Jun. 12, 2018, 20 pages.
International Search Report and Written Opinion, PCT App. No. PCT/IB2017/053444, dated Dec. 21, 2017, 13 pages.
International Search Report and Written Opinion, PCT App. No. PCT/IB2017/058525, dated Jul. 30, 2018, 14 pages.
International Search Report and Written Opinion, PCT App. No. PCT/IB2018/052238, dated Dec. 13, 2018, 12 pages.
International Search Report and Written Opinion, PCT App. No. PCT/IB2018/052239, dated Nov. 29, 2018, 13 pages.
International Search Report and Written Opinion, PCT App. No. PCT/US2017/050046, dated Dec. 13, 2017, 13 pages.
Kapellaki et al., "The "Le" interface: performance evaluation of 2-tier and 3-tier 3GPP compliant realizations," IEEE International Conference on Communications, ICC 2005, vol. 3, No. 16, 2005, pp. 1423-1427.
Latas, "The Drone Safety Platform", available online at <http://www.flylatas.com/>, retrieved on Mar. 31, 2017, 7 pages.
LG Electronics Inc., "Aerial Traffic Handling using Positioning Identification", 3GPP TSG-RAN WG2 Meeting #98, *2-1705660, 3rd Generation Partnership Project (3GPP), Hangzhou, China, May 14, 2017 (May 14, 2017), KP051275974, Retrieved from the Internet: URL:http://www.3gpp.org/ftp/Meetings 3GPP SYNC/RAN2/Docs/.
MAVLINK Common Message set specifications, available online at <http://mavlink.org/messages/common>, retrieved on Jan. 31, 2017, 98 pages.
Opensignal, "Opensignal combines real-world measurements with scientific analysis to provide independent insights on mobile connectivity globally", available online at <https://www.opensignal.com/>, 2020, 4 pages.
Orefice, "ADS-B Based Sense and Avoid Applications for General Aviation/Unmanned Aircraft", available online at <http://www.fedoa.unina.it/10305/1/orefice_martina_27.pdf>, 2015, 114 pages.
Qualcomm, LTE Unmanned Aircraft Systems, Qualcomm Technologies, Inc., Trial Report, v1.0.1, May 12, 2017, 65 pages.
R1-1705823, 3GPP TSG-RAN WG1 Meeting 88bis, Spokane, KDDI Corporation, Field measurement results for drone LTE enhancement, USA, Apr. 3-7, 2017, 6 pages.
Radio Control, Beginners' Guide, available online at <https://rcplanes.online/guide1.htm>, May 8, 2019, 9 pages.
Ruano et al., "Augmented Reality Tool for the Situational Awareness Improvement of UAV Operators", Sensors, vol. 17, 2017, 16 pages.
Second Written Opinion for Application No. PCT/IB2017/054160, dated Jun. 7, 2019, 15 pages.
SUR.ET1.ST05.2000-STD-12-01, Eurocontrol Standard Document for Surveillance Data Exchange, Part 12: Category 021, ADS-B Reports, Dec. 2010, 72 pages.
UAS Identification and Tracking (UAS ID) Aviation Rulemaking Committee (ARC), ARC Recommendations Final Report, Sep. 30, 2017, 213 pages.
uAvionix, "ADS-B Transceivers, Receivers and Navigation Systems for Drones", available online at <http://www.unmannedsystemstechnology.com/company/uavionix-corporation>, retrieved on Apr. 4, 2017, 10 pages.
Unmanned Aircraft System (UAS) Traffic Management (UTM), available online at https://utm.arc.nasa.gov/index.shtml>, retrieved on Apr. 4, 2017, 2 pages.
Wikipedia, "Blockchain", available online at <https://en.wikipedia.org/w/index.php?title=Blockchain&oldid=901056350>, retrieved on Jun. 9, 2019, 20 pages.
Office Action, TW App. No. 107115169, dated Apr. 22, 2019, 9 pages (2 pages of Partial English Translation and 7 pages of Original Document).
Office Action, TW App. No. 107115169, dated Nov. 28, 2018, 17 pages (8 pages of English Translation and 9 pages of Original Document).
International Search Report and Written Opinion for Application No. PCT/IB2017/057810, dated Mar. 13, 2018, 10 pages.

* cited by examiner

METHODS AND SYSTEMS FOR USING AN UNMANNED AERIAL VEHICLE (UAV) FLIGHT PATH TO COORDINATE AN ENHANCED HANDOVER IN 3RD GENERATION PARTNERSHIP PROJECT (3GPP) NETWORKS

CROSS-REFERENCE TO RELATED APPLICATIONS

This application is a national stage of International Application No. PCT/IB2017/057810, filed Dec. 11, 2017, which claims the benefit of U.S. Provisional Application No. 62/502,489, filed May 5, 2017, which are hereby incorporated by reference.

FIELD

Embodiments of the invention relate to the field of managing Unmanned Aerial Vehicles (UAVs); and more specifically, to managing a UAV in a 3rd Generation Partnership Project (3GPP) network during a cell handover based on a flight plan for the UAV.

BACKGROUND

The Federal Aviation Administration (FAA) and National Aeronautics and Space Administration (NASA) are defining an Unmanned Aerial Vehicle (UAV) Traffic Management (UTM) system. Such a system seeks to present an effective management structure for UAV traffic. In this vein, the UTM is sought to act as an enabler to promote widespread use of UAVs in both commercial and recreational settings while at the same time minimizing the perils to manned air traffic and surrounding pieces of infrastructure. The UTM system is designed to work autonomously, with no active human air traffic controller constantly supervising and monitoring the airspace.

Wide-area connectivity enhances the safety and control of UAV navigation, which is critically important for UAV use cases to gain wide acceptance by consumers, regulators, and various industry sectors who have interests in using UAVs for different purposes.

UAV connectivity serves two major purposes. The first major purpose is for command and control of the UAV. In most use cases, a UAV can fly autonomously, from a starting point to a destination. However, providing remote control can significantly enhance the safety and control of a UAV. For example, if there is a change of the flight path of the UAV due to traffic management, it is essential that such information is communicated to the UAV. Accordingly, command and control functionality is essential for supporting UAV traffic management. The second major purpose is for providing data communications with/for the UAV. In particular, use cases like flying cameras and remote surveillance require a UAV to send back real-time/live telemetry data, pictures, and/or videos.

Well established, ubiquitous cellular networks can best provide wide-area connectivity for supporting UAV missions. This wide-area connectivity is made possible through seamless handovers between cells in the cellular network. These seamless handovers ensure that during the duration of a UAV mission, a UAV can be served by a cell with the required reliability and quality of service (QoS). For example, a UAV initially served by cell A may after a certain point be handed over to cell B. In this example, cell A is referred to as the source cell and cell B is referred to as the target cell. Handover in a 3rd Generation Partnership Project (3GPP) network (e.g., a Long-Term Evolution (LTE) network) is enabled through user equipment (UE) measurements (i.e., UAV measurements). In particular, a UE/UAV is given a neighbor cell list and the UE/UAV performs Reference Signal Received Power (RSRP) or Reference Signal Received Quality (RSRQ) measurements for each cell in the neighbor cell list. The measurements are based on known reference signals (e.g., a LTE cell-specific reference signal (CRS)) transmitted by these cells and detected by the UE/UAV. In the meantime, the quality of service of the source/serving cell is measured. A handover process is triggered when the QoS on the source/serving cell to the UE/UAV, as indicated by the UE/UAV measurements, drops below a certain threshold and/or when the UE/UAV measurements for a neighbor cell in the neighbor cell list (e.g., the target cell) exceeds a certain threshold.

However, in the above system, the neighbor cell list and corresponding handover behavior is designed for typical ground based UEs (e.g., phones) and may not be well suited for UAVs. For example, current 3GPP networks provide no features to distinguish between varying altitude UEs and constant altitude UEs and do not utilize the UTM during a handover procedure.

SUMMARY

A method for managing an unmanned aerial vehicle (UAV) is described. The method may include receiving flight plan information describing a flight path of the UAV; generating one or more cell lists based on the flight plan information; and transmitting the one or more cell lists to a source cell in a wireless network in which the UAV is currently operating, wherein the one or more cell lists are used in a handover procedure between the source cell that the UAV is currently connected to and a target cell that the UAV will connect to after completing the handover procedure.

With an optimized neighbor cell list and/or neighbor cell black list, the systems and methods provided herein allow a UAV to more easily identify a suitable target cell for handover. Specifically, utilizing an optimized neighbor cell list and/or neighbor cell black list will result in a smaller list of cells that a UE/UAV needs to measure, compared to non-optimized lists. A smaller measurement list is advantageous for several reasons, including (1) less measurements needed that results in reduced UAV power consumption and signaling for sending back measurement results to the network and (2) given a measurement period, the UAV can perform more smoothing and averaging on each neighbor cell, which improves measurement accuracy.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
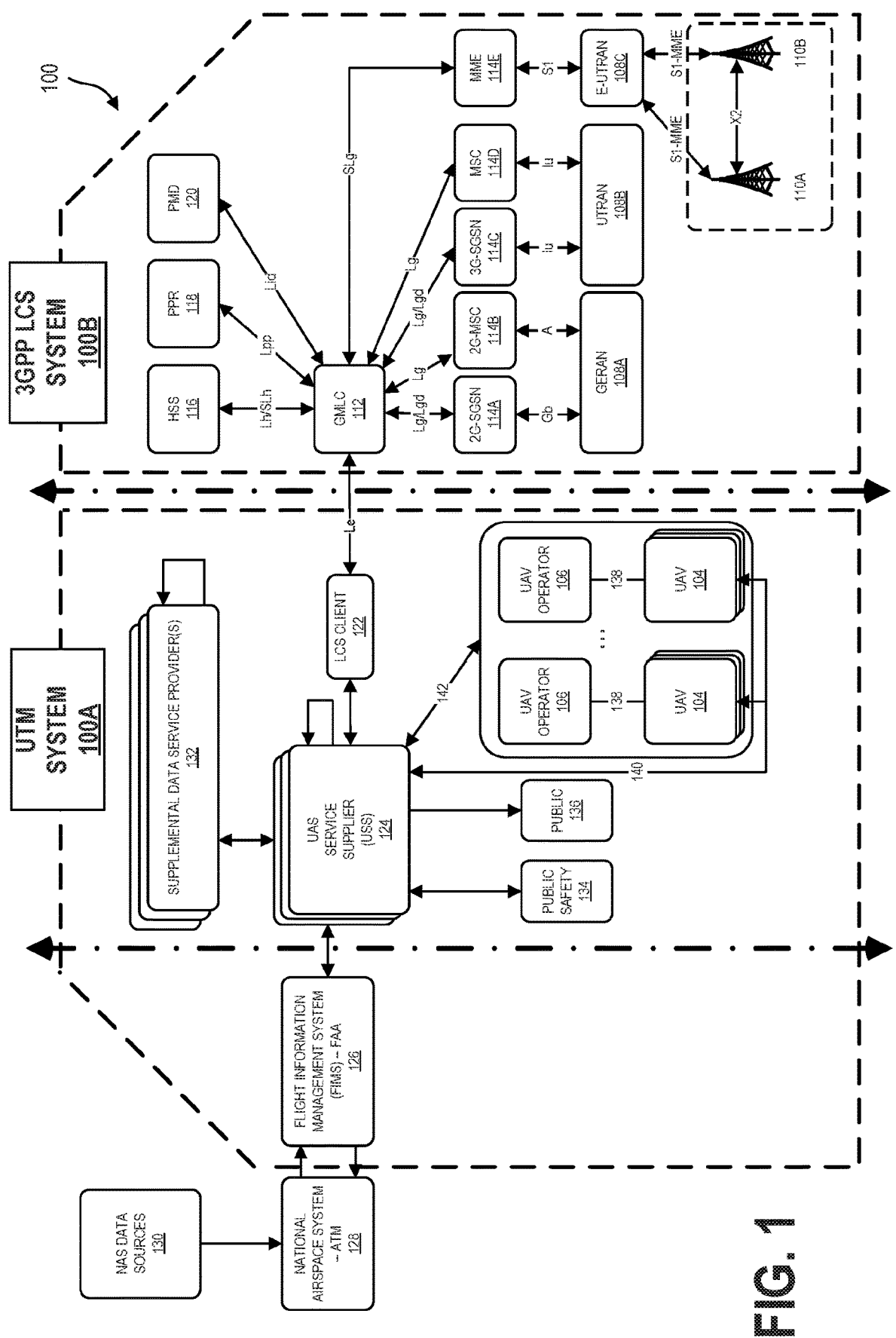
FIG. 1 illustrates an Unmanned Aerial Vehicle (UAV) Traffic Management (UTM) system according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

As described herein, an Unmanned Aerial Vehicle (UAV) operator can share information about a UAV flight plan, including a flight path, which has been authorized/approved by a UAV Traffic Management (UTM) framework/system, with a network (e.g., a cellular network). For example, such information can be provided to a Long-Term Evolution (LTE) Mobility Management Entity (MME) with a dedicated interface and/or set of extensions to existing interfaces. These elements will allow the network to communicate with the UTM or another UAV traffic management entity via the MME. In one embodiment, up-to-date flight path information (e.g., the location of the UAV) can be input to the MME via a Gateway Mobile Location Center (GMLC) server that is part of a 3rd Generation Partnership Project (3GPP) Location Services (LCS) system. With such information, the MME can configure and update one or more cell lists for each UAV in the network that can be used to facilitate handover procedures. As used herein, a handover or a handover procedure involves a UAV disconnecting from a first cell in a network and connecting with a second cell in the network. For example, as a UAV moves away from the first cell, network performance may deteriorate and the UAV may need to connect with a more proximate cell to improve/maintain network performance.

As noted above, handover procedures may be facilitated by one or more cell lists. For example, the one or more cell lists may include a neighbor cell list that indicates cells that the UAV should consider connecting with during a handover procedure. In this example, the UAV may be connected to a source cell (sometimes referred to as a serving cell) and may be recording measurement information from the source cell and all the cells in the neighbor cell list (e.g., Reference Signal Received Power (RSRP) or Reference Signal Received Quality (RSRQ) measurements in relation to a cell-specific reference signal (CRS)). Upon detecting measurement readings associated with the source cell falling below a set of thresholds, a handover procedure may be triggered in which the UAV disconnects from the source cell and connects with a target cell. The target cell may be selected from the neighbor cell list and in particular the target cell may be the cell from the neighbor cell list with the best/highest measurement readings that are over a set of thresholds.

Although described above in relation to neighbor cell lists from which a target cell is selected, the one or more cell lists that are used to perform the handover procedure may also include a neighbor cell black list. This neighbor cell black list may include cells that should not be considered when selecting a target cell for a handover procedure. In particular, a UAV may not record measurements from cells in a neighbor cell black list. Since measurements are not recorded from cells in the neighbor cell black list, these cells will not be considered when selecting a target cell for a handover procedure.

As described above and as will be described in greater detail below, one or more cell lists may be generated to facilitate a handover procedure and these one or more cell lists may be generated based on a flight plan of a UAV that is known, pre-formulated, and/or recorded before takeoff of the UAV and/or before the UAV arrives at a particular part of a flight mission. In contrast to ground based user equipment that operate without a known, pre-formulated, and/or recorded (e.g., a cellphone user moves without pre-formulating and recording a plan) travel/route plan, by taking advantage of a known flight plan of a UAV, including a flight path and/or a set of altitudes of the UAV, the selected target cell used for a handover procedure may provide improved network connectivity for the UAV (e.g., on average higher bandwidth and/or higher signal to noise ratio for a longer period of time in comparison to not using a flight plan to select a target cell). Specifically, when not considering a known, pre-formulated, and/or recorded flight plan, a target cell may be selected from a set of any neighboring cells based solely on proximity and/or high recorded measurements. These high recorded measurements may correspond to the UAV initially being proximate to the selected target cell when the measurements are recorded. However, the UAV may intend to move away from the selected target cell shortly after the handover procedure is completed, which would result in poor network performance and possibly the need for another handover procedure with a new target cell. This movement away from the selected target cell may be predicted based on a known flight plan, including a flight path, such that a target cell may be selected that is along a future portion of a flight path of the UAV instead of away from a future portion of a flight path of the UAV. In particular, the neighbor cell list may be populated with cells that are along the future portion of the flight path of the UAV and a neighbor cell black list may be populated with at least cells that are not along the future portion of the flight path of the UAV (e.g., cells along part of the flight path that has already been traversed and/or cells entirely outside the flight path).

With an optimized set of one or more cell lists, including a neighbor cell list and/or neighbor cell black list, the systems and methods provided herein allow a UAV to more easily identify a suitable target cell for handover. Specifically, utilizing an optimized neighbor cell list, which only includes cells along a flight path of a UAV, and/or neighbor cell black list, which at least includes cells outside a flight path of the UAV, will result in smaller lists of cells that a UAV needs to measure, compared to non-optimized lists. A smaller measurement list is advantageous for several reasons, including (1) less measurements needed that results in reduced UAV power consumption and signaling for sending back measurement results to the network and (2) given a measurement period, the UAV can perform more smoothing and averaging on each neighbor cell, which improves measurement accuracy.

Turning now to FIG. 1, an air traffic system 100 will be described for managing a flight of a UAV 104, according to one embodiment. The air traffic system 100 may be used for managing the flights of one or more UAVs 104 that are controlled/operated/piloted by corresponding UAV operators 106. The UAVs 104 may be interchangeably referred to as Unmanned Aircraft Systems (UASs) or drones throughout this description. The air traffic system 100 may be divided into two logical portions: a UAV Traffic Management (UTM) system 100A and a 3GPP Location Services (LCS) system 100B. In this configuration, the UTM system 100A provides flight path information to the 3GPP LCS system 100B and the 3GPP LCS system 100B provides location services and connectivity to components of the UTM system 100A.

The 3GPP LCS system 100B provides location information of the UAVs 104 based on wireless communications of the UAVs 104 in the wireless network 108. For instance, the 3GPP LCS system 100B may determine the location information of a particular UAV 104 based on radio signal measurements of the UAV 104 and estimating the location of the UAV 104 based on those radio signal measurements (e.g., triangulation of the radio signal measurements). Thus, the 3GPP LCS system 100B provides network-determined location information of the UAVs 104, as opposed to location information being reported by the UAVs 104 themselves.

Although described in relation to location services provided by a 3GPP protocol, the systems described herein should not be construed as limited to 3GPP protocols or cellular networks. In other embodiments, location services may be provided by other cellular and wireless network providers that offer access to geographical location information of the UAV 104 based on wireless communications of the UAV 104 in networks operated by the network providers. In one embodiment, the location services may be provided by a wireless local area network. In still other embodiments, location information of the UAVs 104 may be provided through other systems, including through use of the Global Positioning System (GPS) or a similar satellite based system.

In some embodiments, the UAVs 104 may be small or miniature UAVs, which are unmanned aircraft that are small enough to be considered portable by an average man and typically operate/cruise at altitudes lower than larger aircraft. For example, a small UAV may be any unmanned aircraft that is fifty-five pounds or lighter and/or is designed to operate below 400 feet. Although the embodiments described herein may be applied to small UAVs, the systems and methods are not restricted to aircraft of these sizes or that are designed to operate at particular altitudes. Instead, the methods and systems described herein may be similarly applied to aircraft of any size or design and with or without an onboard pilot/operator. For example, in some embodiments, the methods and systems described herein may be used for UAVs 104 larger than fifty-five pounds and/or UAVs 104 that are designed to fly above 400 feet.

The UAVs 104 are aircraft without an onboard human controller. Instead, the UAVs 104 may be operated/piloted using various degrees of autonomy. For example, a UAV 104 may be operated by a human (e.g., the UAV operator 106) located on the ground or otherwise removed and independent of the location of the UAV 104. For example, a UAV operator 106 may be located on the ground and acts to directly control each movement of a UAV 104 or a group of UAVs 104 through a radio control interface (e.g., a command and control (C2) interface). In this embodiment, the UAV operator 106 may transmit commands via the radio interface to cause the UAV 104 to adjust/move particular flight instruments (e.g., flaps, blades, motors, etc.) for the purpose of following a flight plan or another set of objectives. In other scenarios, the UAV operator 106 may provide a flight plan to the UAV 104. In response to the flight plan, the UAV 104 may adjust/move particular flight instruments to fulfill objectives of the flight plan. In these embodiments, a human operator may monitor the progress of the flight plan and intervene as needed or as directed. In some embodiments, the UAV operator 106 may be viewed as the remote human controller, a remote digital controller, an onboard digital controller, or a combination of the preceding.

Figure 2:
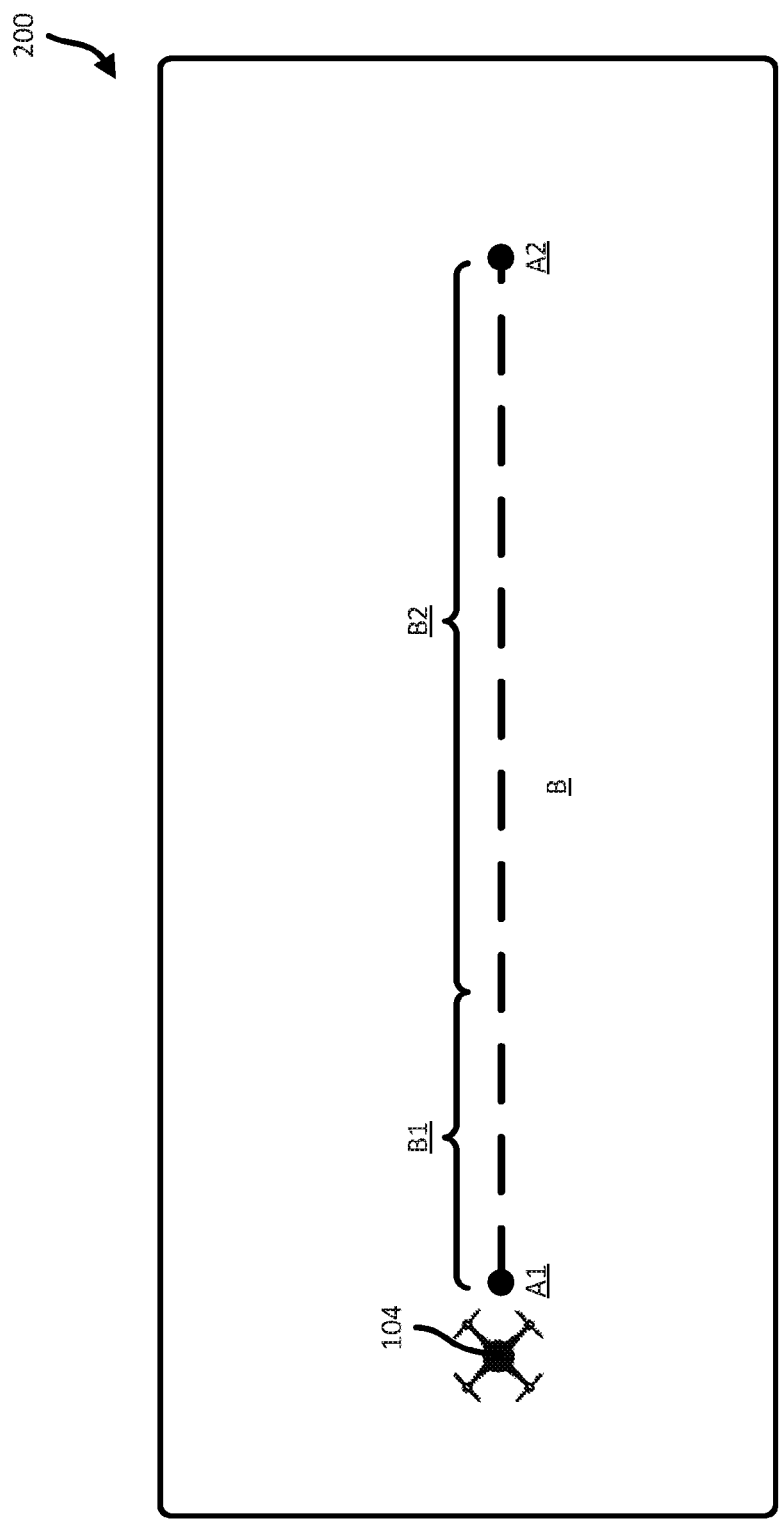
FIG. 2 illustrates an example flight plan with a set of coordinates according to one embodiment.

A flight plan may include one or more points of a path (e.g., a starting point, an ending point, and/or a set of waypoints, where each are defined by longitudinal and latitudinal coordinates), a set of velocities, a set of altitudes, a set of headings/directions, a set of events (e.g., capture video at prescribed times or locations, hover over an area for a specified interval, etc.), a time/expiration/duration, and a set of restricted zones/areas. For instance, the flight plan 200 shown in FIG. 2 indicates that the UAV 104 is to take off from location A1 (corresponding to a first set of longitude and latitude coordinates) and travel to location A2 (corresponding to a second set of longitude and latitude coordinates) using the path B. The path B may be separated into the segments B1 and B2. In this scenario, the UAV 104 is restricted to an altitude between 300 feet and 400 feet and a velocity of 100 miles/hour during segment B1 and an altitude between 350 feet and 400 feet and a velocity of 90 miles/hour during segment B2. The above altitude and velocity limitations are merely exemplary and in other embodiments higher altitude and velocity limitations may be assigned/issued for a UAV 104 (e.g., altitude limitations above 400 feet and velocity limitations above 100 miles/hour).

Figure 3:
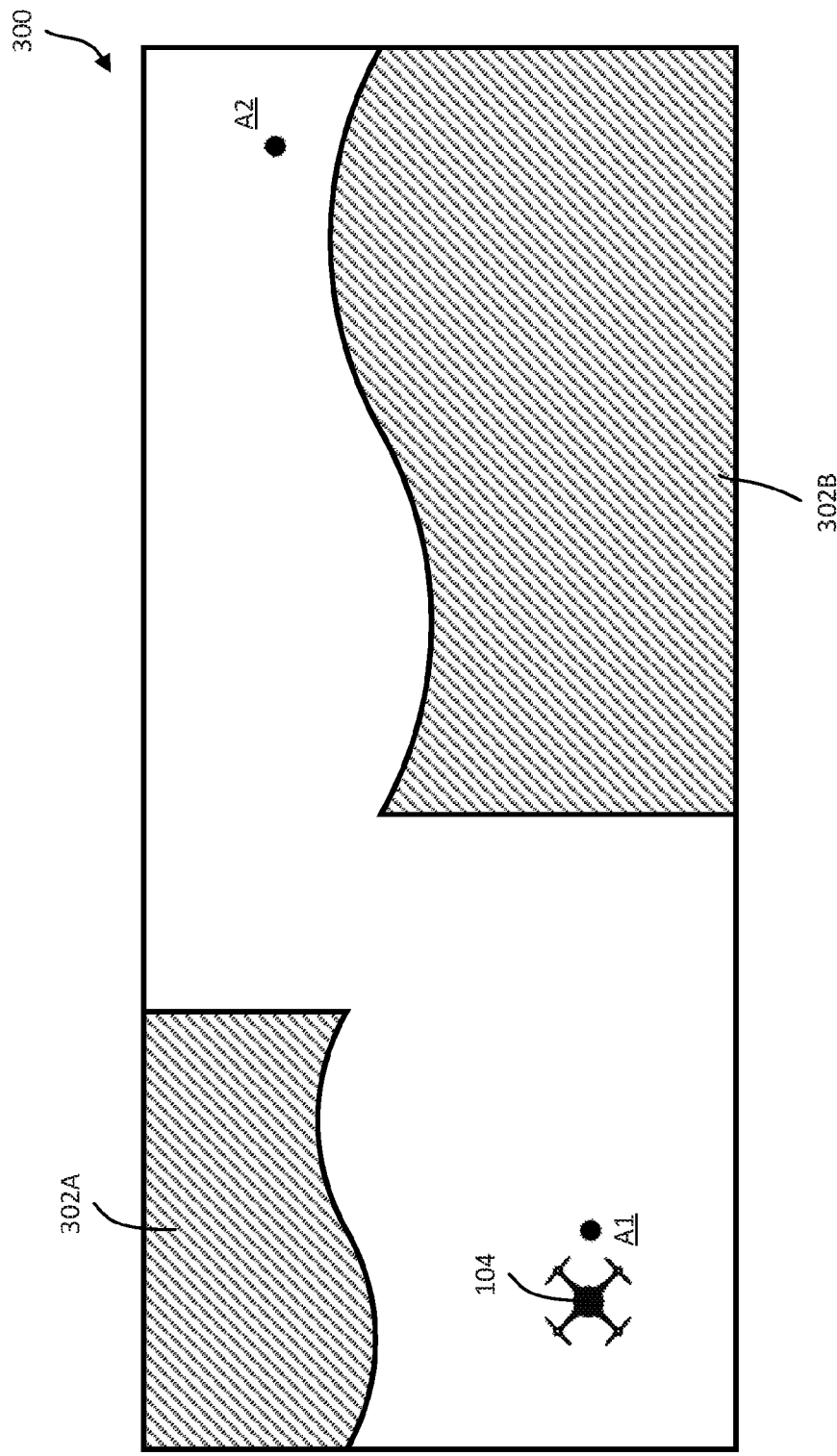
FIG. 3 illustrates an example flight plan with a set of restricted areas/zones according to one embodiment.

In another example, as shown in FIG. 3, a flight plan 300 may indicate that the UAV 104 is to take off from location A1, travel to location A2, and avoid a set of restricted zones 302A and 302B. In this example, the UAV 104 is directed to reach the target location A2 without entering the set of restricted zones 302A and 302B. The restricted zones may be relative to geographical location (defined by a set of coordinates), an altitude, and/or a velocity. For example, the UAV 104 may be permitted to enter restricted zone 302A but only at a prescribed altitude and/or only at a prescribed velocity.

Figure 4:
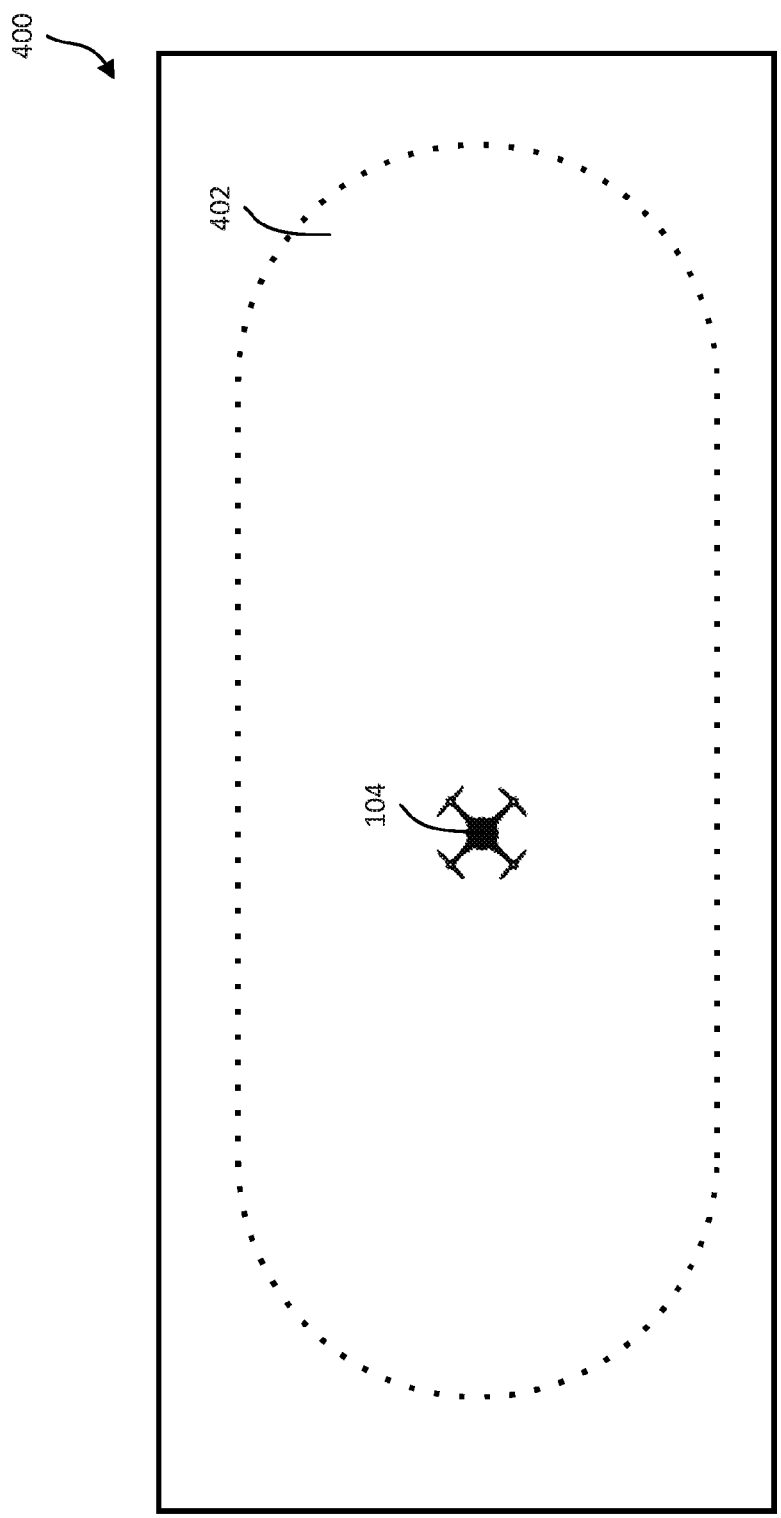
FIG. 4 illustrates an example flight plan with a designated clearance zone according to one embodiment.

In still another example, shown in FIG. 4, a flight plan 400 may provide clearance for the UAV 104 to fly in a designated clearance zone 402. The clearance zone 402 may be a confined area associated with an altitude range (e.g., between 400-500 feet) and/or an expiration/duration (e.g., an expiration of 11:40 PM). In this example, the UAV 104 may fly anywhere in the designated clearance zone 402 until the clearance has expired.

Although the flight plans described above are provided in relation to diagrams, flight plans may be encoded/presented using any format. For example, a flight plan may be represented and passed to the UAV 104 using an extensible markup language (XML) based format or another encoding or representation that is decodable and parseable by a machine.

Figure 5:
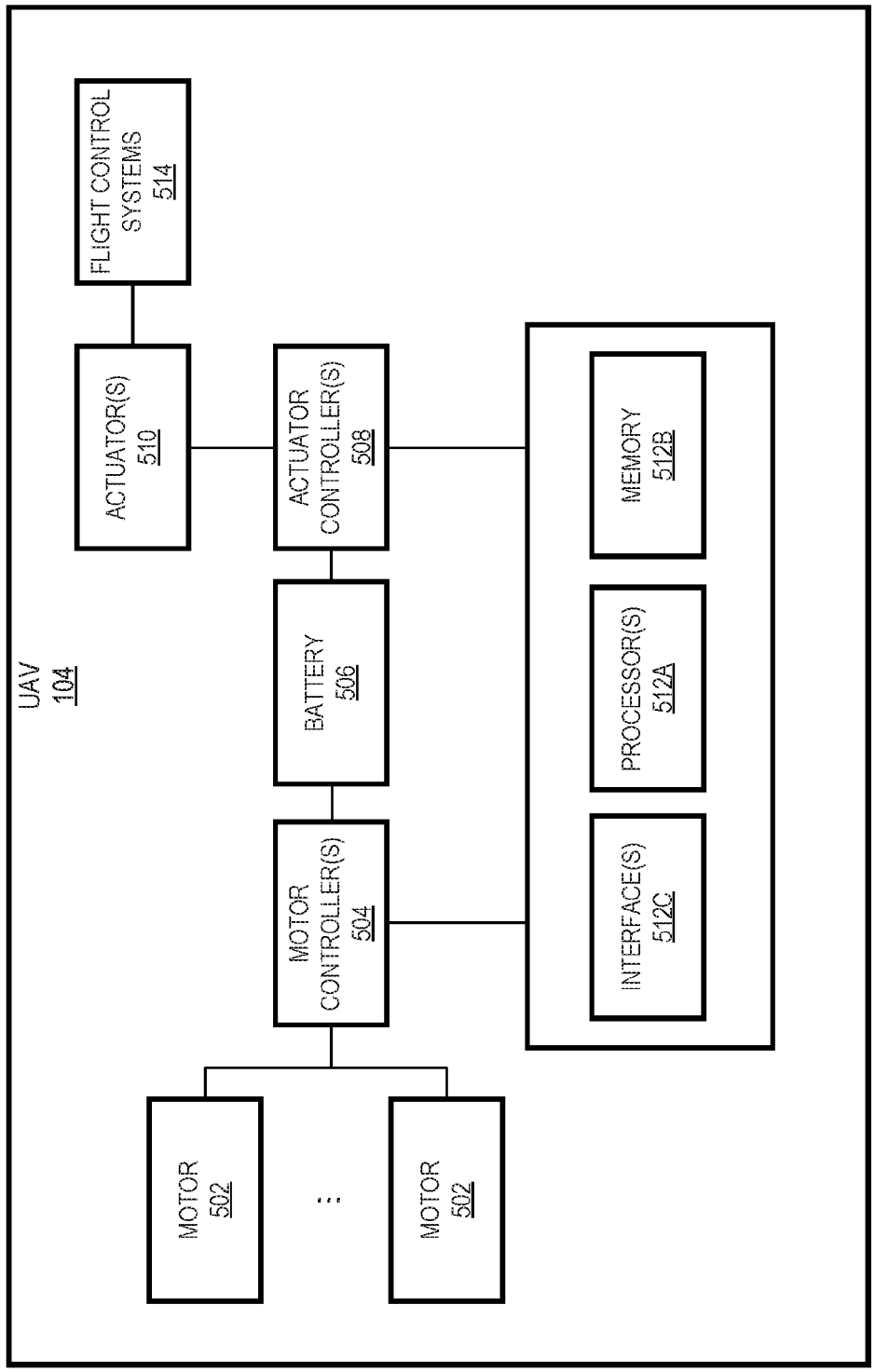
FIG. 5 illustrates a block diagram of a UAV according to one example embodiment.

FIG. 5 shows a block diagram of a UAV 104 according to one example embodiment. Each element of the UAV 104 will be described by way of example below and it is understood that each UAV 104 may include more or less components than those shown and described herein.

As shown in FIG. 5, a UAV 104 may include a set of motors 502 controlled by one or more motor controllers 504, which control the speed of rotation of the motors (e.g., rounds per minute). As used herein, the term engine may be used synonymously with the term motor and shall designate a machine that converts one form of energy into mechanical energy. For example, the motors 502 may be electrical motors that convert electricity stored in the battery 506 into mechanical energy. The UAV 104 may include any number of motors 502 that are placed in any configuration relative to the body and/or an expected heading of the UAV 104. For example, the motors 502 may be configured such that the UAV 104 is a multirotor helicopter (e.g., a quadcopter). In other embodiments, the motors 502 may be configured such that the UAV 104 is a fixed wing aircraft (e.g., a single engine or dual engine airplane). In these embodiments, the motors 502, in conjunction with other elements of the UAV 104 serve to keep the UAV 104 in flight and/or propel the UAV 104 in a desired direction. In some embodiments, the UAV 104 may not include motors 502 for propelling the UAV 104 forward. In this embodiment, the UAV 104 may be a glider or lighter than air craft (e.g., a weather balloon).

As noted above, the motors 502 are controlled by one or more motor controllers 504, which govern the speed of rotation of each motor 502. In one embodiment, the motor controllers 504 may work in conjunction with actuator controllers 508 and actuators 510 that control the pitch/angle/rotation of propellers, flaps, slats, slots, rotors, rotor blades/wings, and other flight control systems 514. The motor controllers 504 and actuator controllers 508 may be managed/controlled by one or more processors 512A that are communicatively coupled to a memory 512B and one or more interfaces 512C.

In some embodiments, the memory 512B may store instructions that when executed by the processors 512A cause the UAV 104, via adjustments to settings/parameters of the motor controllers 504 and actuator controllers 508, to move in a particular direction (vertical or horizontal) or maintain a particular flight pattern (e.g., hover at a particular altitude).

The UAV 104 may communicate with one or more other devices using the one or more interfaces 512C. In one embodiment, one of the interfaces 512C in a UAV 104 may comply with a 3GPP protocol. For example, the interface 512C may adhere to one or more of Global System for Mobile communication (GSM) (including General Packet Radio Service (GPRS) and Enhanced Data Rates for GSM Evolution (EDGE)), UMTS (including High Speed Packet Access (HSPA)), and Long-Term Evolution (LTE). In some embodiments, one or more interfaces 512C in the UAV 104 may allow a UAV operator 106 and/or other parts of the UTM system 100A to control or provide plans/instructions to the UAV 104.

In one embodiment, the UAV 104 may operate in the GSM EDGE Radio Access Network (GERAN) 108A, the Universal Terrestrial Radio Access Network (UTRAN) 108B, and/or the Evolved Universal Mobile Telecommunications System (UMTS) Terrestrial Radio Access Network (E-UTRAN) 108C using one or more of the interfaces 512C. The GERAN 108A, the UTRAN 108B, and/or the E-UTRAN 108C may be administered by a network operator (e.g., a cellular network operator) and the UAV 104 may be a subscriber to one or more of these networks 108A, 108B, and 108C. The GERAN 108A, the UTRAN 108B, and/or the E-UTRAN 108C may comprise various network devices. Each of the network devices may, in some embodiments, be electronic devices that can be communicatively connected to other electronic devices on the network (e.g., other network devices, user equipment devices (such as the UAV 104), radio base stations, etc.). In certain embodiments, the network devices may include radio access features that provide wireless radio network access to other electronic devices such as user equipment devices (UEs) (for example a "radio access network device" may refer to such a network device). For example, the network devices may be base stations, such as an enhanced NodeB (eNodeB) in Long-Term Evolution (LTE), a NodeB in Wideband Code Division Multiple Access (WCDMA), or other types of base stations, as well as a Radio Network Controller (RNC), a Base Station Controller (BSC), or other types of control nodes. Each of these network devices that include radio access features to provide wireless radio network access to other electronic devices may be referred to cells, including macro-cells, micro-cells, pico-cells, and satellite cells, (e.g., the cells 110A and 110B), towers, cellular towers, or the like. In some embodiments, an interface 512C in a UAV 104 may assist in estimating a geographical location of the UAV 104 based on communications within the GERAN 108A, the UTRAN 108B, and/or the E-UTRAN 108C.

Although described in relation to the geographical location of the UAV 104, the location information provided by the 3GPP LCS system 100B may be extended to also include additional pieces of information. For example, in addition to geographical location, the location information provided by the 3GPP LCS system 100B may also include velocity and direction/heading of the UAV 104 as estimated by the access networks GERAN 108A, UTRAN 108B, and/or E-UTRAN 108C. In some embodiments, the location information may describe an estimated current location, velocity, and/or heading of the UAV 104 or an anticipated location, velocity, and/or heading of the UAV 104. Further, although described in relation to obtaining location information from network provided location services/systems (e.g., 3GPP Location Services (LCS)), in other embodiments other location services/systems may be used (e.g., the Global Positioning System (GPS)).

Figure 6A:
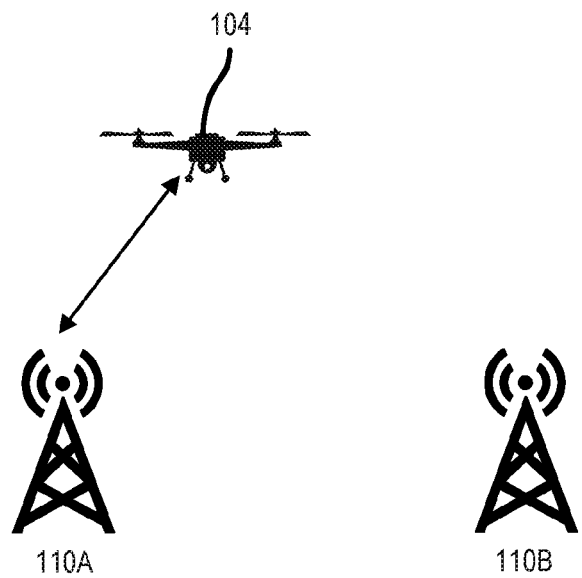
FIG. 6A illustrates a UAV initially coupled to Cell A according to one embodiment.
Figure 6B:
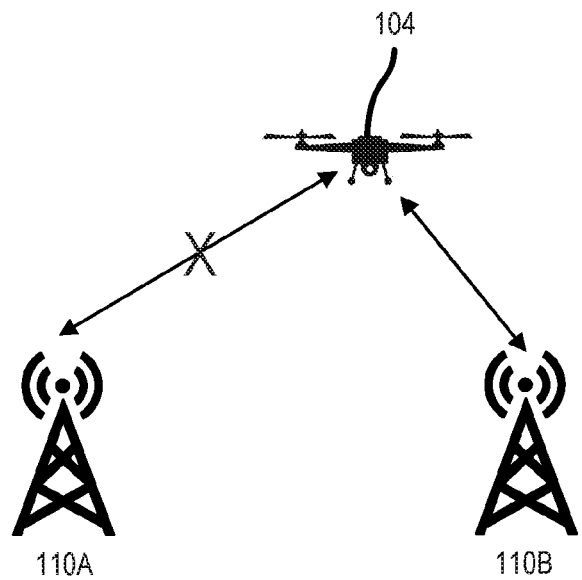
FIG. 6B illustrates a UAV handover from Cell A to Cell B according to one embodiment.

As noted above, the UAV 104 may be coupled to electronic devices on the network, including cell 110A or cell 110B. In this embodiment, the UAV 104 is coupled to either the cell 110A or the cell 110B such that the UAV 104 may operate on a network of cells 110A and 110B (e.g., GERAN 108A, UTRAN 108B, or E-UTRAN 108C). For example, as shown in FIG. 6A, the UAV 104 is initially coupled to cell 110A such that the UAV 104 may maintain wireless radio network access via cell 110A. As shown in FIG. 6B, as the UAV 104 moves away from cell 110A and towards cell 110B, the UAV 104 may disconnect from cell 110A and connect to cell 110B through a handover procedure such that the UAV 104 may maintain wireless radio network access via cell 110B instead of cell 110A. As will be described in greater detail below, the handover procedure transferring the UAV 104 from cell 110A to cell 110B may be facilitated by one or more cell lists (e.g., a neighbor cell list and a neighbor cell black list) that are generated based on a flight plan (including a flight path) of the UAV 104.

A UAV operator 106 may maintain a connection with a corresponding UAV 104 via connection 138. The connection 138 may be established through one or more interfaces 512C and may form a wireless command and control (C2) connection that allows the UAV operator 106 to control the UAV 104 through direct commands and/or through issuance of a flight plan. In some embodiments, the connection 138 may additionally allow the UAV operator 106 to receive data from the UAV 104. For example, the data may include images, video streams, telemetry data, and system status (e.g., battery level/status). In some embodiments, the connection 138 may be a point-to-point (e.g., mesh) connection while in other embodiments the connection 138 between the UAV operator 106 and the UAV 104 may be part of a distributed network. In one embodiment, the connection 138 is separate from the access networks GERAN 108A, UTRAN 108B, and E-UTRAN 108C while in other embodiments the connection 138 is part of one of the access networks GERAN 108A, UTRAN 108B, and E-UTRAN 108C.

In one embodiment, the UAV 104 may maintain a connection with a UAV Service Supplier (USS) 124. For example, the UAV 104 may maintain the connection 140 with the USS 124. In some embodiments, the connection 140 may be a point-to-point connection while in other embodiments the connection 140 may be part of a distributed network. In one embodiment, the connection 140 is separate from the access networks GERAN 108A, UTRAN 108B, and E-UTRAN 108C, while in other embodiments the connection 140 is part of one of the access networks GERAN 108A, UTRAN 108B, and E-U IRAN 108C. In one embodiment, the connection 140 may allow the transmission of one or more pieces of data to the USS 124, including telemetry, authentication/authorization (e.g., using a subscriber identity/identification module (SIM) based identity to check UAV 104 registrations and authorizations), reports and logs (e.g., to establish liability in case of accidents), and commands to ensure compliance and safety (e.g., land immediately). The connection 140 may alternatively provide access to a data center to provide data for storage for the UAV 104 (e.g., storage of video streams or images captured by the UAV 104).

In one embodiment, the UAV operator 106 may maintain a connection with other elements of the UTM system 100A. For example, the UAV operator 106 may maintain connection 142 with the USS 124. In some embodiments, the connection 142 may be a point-to-point connection while in other embodiments the connection 142 may be part of a distributed network. In one embodiment, the connection 142 is separate from the access networks GERAN 108A, UTRAN 108B, and E-UTRAN 108C while in other embodiments the connection 142 is part of one of the access networks GERAN 108A, UTRAN 108B, and E-UTRAN 108C.

In one embodiment, the connection 142 allows the UAV operator 106 to transmit data to or receive data from the USS 124 regarding a current, past, or future flight. For instance, the connection 142 may allow the UAV operator 106 to convey to the USS 124 one or more of the following: airspace information, alarms and notifications, authentication/authorization (e.g., use of a SIM based identity to check UAV 104 and pilot/UAV operator 106 registrations and authorizations), and reports and logs (e.g., to establish liability in case of accidents).

In some embodiments, the UAV operator 106 may transmit a proposed flight plan to the USS 124 via the connection 142. In one embodiment, the UTM system 100A may include a plurality of USSs 124. The set of USSs 124 may alternatively be referred to as a USS network. Each USS 124 offers support for safe airspace operations based on information received from a set of stakeholders and other information sources. The USSs 124 may share information about their supported operations to promote safety and to ensure that each USS 124 has a consistent view of all UAV 104 operations and thus enable the UAV 104 to stay clear of each other.

As noted above, the USSs 124 may receive information from a variety of stakeholders and information sources such that the USSs 124 may determine whether a proposed flight plan is authorized to proceed. For example, the Federal Aviation Association (FAA) may provide directives and constraints to the USSs 124 via the Flight Information Management System (FIMS) 126. The FIMS 126 provides administration officials a way to issue constraints and directives to the UAV operators 106 and/or the UAV 104 via a USS 124. Such constraints and directives may be based on information received from the National Airspace System (NAS) Air Traffic Management (ATM) system 128 and/or other NAS data sources 130. In this example, the ATM system 128 could be used to mark certain restricted areas (e.g., airports and military bases) for the UAV 104 or restrict flights over forest fire areas or other spaces which are normally permitted for the UAV 104. In addition to the airspace state and other data provided by the ATM system 128 and other NAS data sources 130, the FIMS 126 may provide impact data, which may describe effects caused by the UAV 104 to a common airspace. Although described in relation to U.S. regulatory authorities, the systems and methods described herein may be similarly applied using any regulatory authority/agency overseeing any jurisdiction/territory/airspace.

In addition to constraints and directives received from the FIMS 126, the USSs 124 may receive data from supplemental data service providers 132. These supplemental data service providers 132 may provide various pieces of data that are used by the USSs 124 in planning and authorizing a flight plan, including terrain, weather, surveillance, and performance information. The supplemental data service providers 132 may communicate amongst each other to insure consistency and accuracy of information. In some embodiments, the supplemental data service providers 132 may provide data that is presented/transmitted to UAV operators 106 via the USS 124 for the planning of a flight plan/mission.

In some embodiments, the USSs 124 may receive constraints from public safety sources 134. This information may limit UAV 104 missions over areas when such flights may negatively affect public safety. For example, UAV 104 missions may be limited over areas that are currently hosting events with large crowds of people. In some embodiments, the public safety sources 134 may provide data that is presented/transmitted to UAV operators 106 via the USS 124 for the planning of a flight plan/mission. The USSs 124 may also make UAV 104 flight/operation information available to the public 136.

As noted above, the USS 124 may determine if a proposed flight plan is authorized in view of directives, constraints, and information received from various stakeholders/sources. After concluding that the proposed flight plan is authorized or not authorized to proceed, the USS 124 may transmit a response to the UAV operator 106. In response to receiving an authorized flight plan, the UAV operator 106 may begin controlling the UAV 104 to effectuate the authorized flight plan or the UAV operator 106 may transmit the authorized flight plan or some set of instructions describing the objectives of the authorized flight plan to the UAV 104. Based on inputs from the UAV operator 106, the processor 512A together with instructions stored in the memory 512B may control the motor controllers 504 and/or actuators 510 to achieve the objectives of the flight plan.

To ensure that the UAV 104 does not deviate from the authorized flight plan, the USS 124 may make use of geographical location information (e.g., the current location of the UAV 104). In one embodiment, this location information may be received/accessed by the UTM system 100A, via a Location Service (LCS) client 122, from the 3GPP LCS system 100B. The 3GPP LCS system 100B may represent a service standardized by various organizations. For example, the 3GPP LCS system 100B may be covered under Global System for Mobile Communications (GSM) and Universal Mobile Telecommunications Service (UMTS). As described herein, the 3GPP LCS system 100B specifies network elements/entities, the functionalities of all elements/entities, interfaces for inter/intra element/entity communications, as well as messages used to implement positioning functionality in a network. The 3GPP LCS system 100B may include access to location information, such as longitude and latitude coordinates, altitude, velocity, and direction/heading of a UAV 104. In one embodiment, the location information may be provided at a prescribed interval (e.g., every minute), upon request, or in response to an event (e.g., a UAV 104 entering a specified area).

As shown, the 3GPP LCS system 100B may include a Gateway Mobile Location Centre (GMLC) 112, which contains functionality required to support location services. The GMLC 112 may act as the gateway to the 3GPP LCS system 100B for the UTM system 100A. As such, the GMLC 112 is generally the first node an external LCS client 122 of the UTM system 100A accesses when attempting to obtain location information from the 3GPP LCS system 100B. As shown, the LCS client 122 within the UTM system 100A may access/communicate with the GMLC 112 via the Le interface. In some embodiments, the Le interface may require extensions to provide additional information (e.g., altitude information to provide three-dimensional geo-fencing zones). The GMLC 112 may be network/network operator specific and each network may include one or more GMLCs 112.

In one embodiment, the LCS client 122 may facilitate the transmission of flight information to the 3GPP LCS 100B via the GMLC 112. For example, the flight information may include a flight plan for the UAV 104, which was approved by the UTM system 100A. As will be described in greater detail below, the flight plan, including a flight path of the UAV 104, may be used for generating one or more cell lists for a handover procedure.

In one embodiment, the GMLC 112 may be communicatively coupled to various support services, including a Home Subscriber Server (HSS) 116, a Privacy Profile Register (PPR) 118, and a Pseudonym Mediation Device (PMD) 120. For example, the GMLC 112 may request information from the HSS 116 via the Lh or SLh interfaces. The HSS 116 may contain or have access to a master user database that supports network access. For example, the HSS 116 may contain or have access to subscription-related information (subscriber profiles) for performing authentication and authorization of users (e.g., authentication of an account associated with an interface 512C of the UAV 104). In some embodiments, the HSS 116 can provide information about the subscriber's location and Internet Protocol (IP) information. In some embodiments, the HSS 116 may function similarly to a GSM home location register (HLR) and/or an Authentication Centre (AuC).

In some embodiments, the UTM system 100A may request and receive network subscription information associated with a UAV 104. In particular, since the 3GPP LCS system 100B is network operator specific, the UTM system 100A must be aware of which network operator and what account is associated with a UAV 104. Upon receipt of network subscription information associated with a UAV 104, the LCS client 122 may pass along this information to an applicable GMLC 112 (e.g., a GMLC 112 associated with the network operator designated in the received subscription information). A GMLC 112 that received this information may work in conjunction with the HSS 116 and/or another support service in the 3GPP LCS system 100B to access location information associated with the applicable UAV 104.

In some embodiments, the GMLC 112 may utilize the PPR 118 to perform a privacy check via the Lpp interface. In some embodiments, the HSS 116 may provide the GMLC 112 with an address to access the PPR 118. Although shown as separate, in some embodiments, the PPR 118 may be integrated within the GMLC 112.

In some embodiments, the GMLC 112 may utilize the PMD 120 to translate a pseudonym of a target UAV 104 with a verinym/true identity (e.g., International Mobile Subscriber Identity or Mobile Station Integrated Services Data Network) via the Lid interface. The PMD 120 may be separate from the GMLC 112 and the PPR 118 or integrated within either.

The GMLC 112 may send positioning/location requests to various controllers 114 associated with separate access networks 108. In response to the requests, the controllers 114 coordinate and submit final location estimates of a corresponding UAV 104 to the GMLC 112. In some embodiments, the GMLC 112 may communicate via the Lg (Mobile Application Part-based) or Lgd (Diameter-based) interfaces with a 2G Serving General Packet Radio Service (GPRS) Support Node (SGSN) 114A or via the Lg interface with a 2G Mobile services Switching Centre (MSC) 114B for a GSM EDGE Radio Access Network (GERAN) 108A. In this embodiment, the 2G-SGSN 114A may communicate with the GERAN 108A via the Gb interface and the 2G-MSC 114B may communicate with the GERAN 108A via the A interface. The 2G-SGSN 114A and the 2G-MSC 114B may manage charging/billing, location request management, authorization of location services, and general operation of location services for the GERAN 108A.

In some embodiments, the GMLC 112 may communicate via the Lg or Lgd interfaces with a 3G-SGSN 114C or via the Lg interface with an MSC server 114D for a Universal Terrestrial Radio Access Network (UTRAN) 108B. In this embodiment, the 3G-SGSN 114C and the MSC server 114D may communicate with the UTRAN 108B via the Iu interface. The 3G-SGSN 114C and the MSC server 114D may manage charging/billing, location request management, authorization of location services, and general operation of location services for the U IRAN 108B.

In some embodiments, the GMLC 112 may communicate via the SLg interface with a Mobility Management Entity (MME) 114E of an Evolved Universal Mobile Telecommunications System (UMTS) Terrestrial Radio Access Network (E-UTRAN) 108C. In this embodiment, the MME 114E may communicate with the E-UTRAN 108C via the S1 interface. The MME 114E may manage charging/billing, location request management, authorization of the LCS services, and general operation of location services for the E-U IRAN 108C.

As noted above, the access networks GERAN 108A, UTRAN 108B, and E-UTRAN 108C may estimate the location of a UAV 104 and make this location information available to other systems (e.g., the UTM system 100A). In particular, the access networks GERAN 108A, UTRAN 108B, and E-UTRAN 108C, that facilitate determination of the locations of user equipment (e.g., the UAV 104), are able to exchange location information with the core network (e.g., the controllers 114 and/or the GMLC 112) when connected to the core network. Location information may also be communicated between GMLCs 112, located in the same or a different public land mobile network (PLMN), via the specified GMLC to GMLC interface.

As noted above, the UTM system 100A may include a LCS client 122. The LCS client 122 may bridge the UTM system 100A and the 3GPP LCS system 100B to allow air traffic system 100 to manage flights of the UAV 104 based on the location information provided by the 3GPP LCS system 100B. In particular, the UTM system 100A may ensure that the UAV 104 adhere to directives, constraints, approved flight plans, approved deviations, and other rules and regulations based on locations provided in real time via the LCS client 122 and the GMLC 112.

In one embodiment, the UTM system 100A may make a flight plan, including a flight path, available to a controller 114 of a corresponding access network to which the UAV 104 is currently connected via the LCS client 122 and the GMLC 112. Providing the flight plan to one or more controllers 114 allows the controllers 114 to manage handover procedures for the UAV based on the flight plan.

In some embodiments, one or more of the portions of the air traffic system 100 may be implemented through virtualization. For example, a cloud execution environment (e.g., one or more virtual machines or containers) may be used by the GMLC 112 to manage requests from the LCS client 122.

Figure 7:
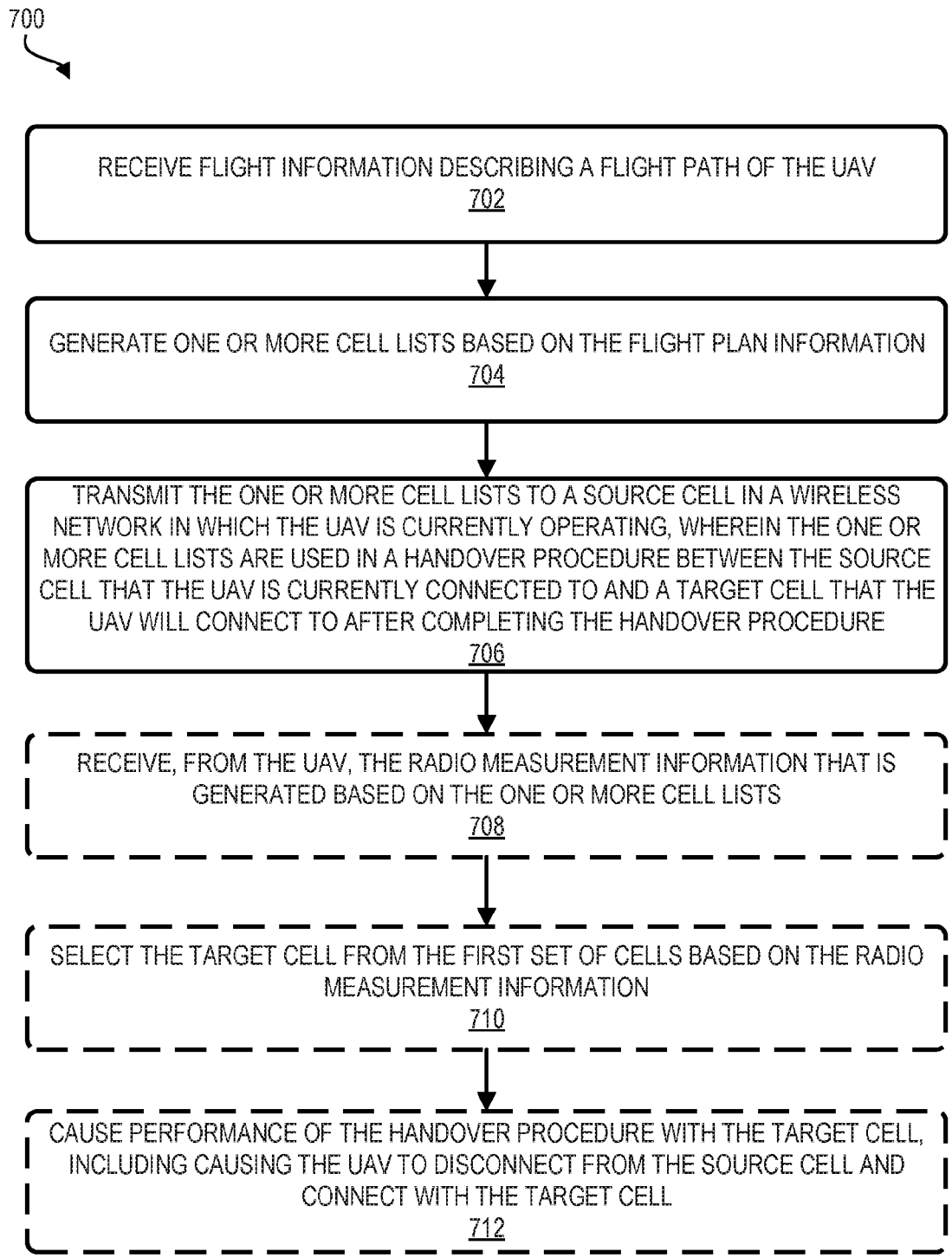
FIG. 7 is a flow diagram of a method for managing a UAV according to an embodiment.

FIG. 7 describes a method 700 for managing an unmanned aerial vehicle (UAV) according to an embodiment. The operations in the diagram of FIG. 7 will be described with reference to the exemplary implementations of the other figures. However, it should be understood that the operations of the diagram can be performed by implementations other than those discussed with reference to the other figures, and the implementations discussed with reference to these other figures can perform operations different than those discussed with reference to the diagram. Although described and shown in FIG. 7 in a particular order, the operations of the method 700 are not restricted to this order. For example, one or more of the operations of the method 700 may be performed in a different order or in partially or fully overlapping time periods. Accordingly, the description and depiction of the method 700 is for illustrative purposes and is not intended to restrict to a particular implementation.

In one embodiment, the method 700 may commence at operation 702 with receipt of flight information describing a flight path of the UAV 104. In some embodiments, the flight plan information that describes the flight path of the UAV 104 was approved by the UTM system 100A and is received by a component of a wireless network (e.g., the MME 114E). In some embodiments, the flight plan information includes altitude information in addition to a set of points that define a flight path.

Figure 8:
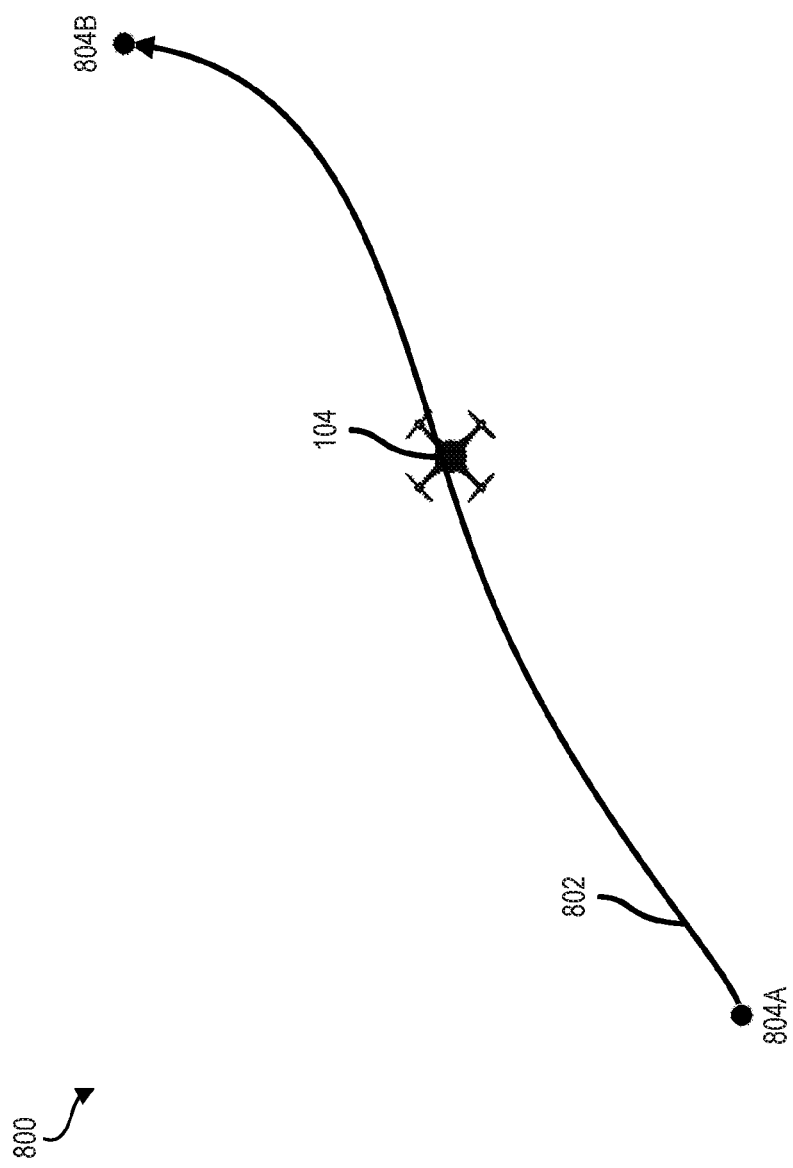
FIG. 8 illustrates an example flight plan with a flight path according to one embodiment.

FIG. 8 shows an example flight plan 800, including the flight path 802 according to one example embodiment. As shown in FIG. 8, the flight path 802 begins at starting point 804A and ends an ending point 804B. Although not shown, the path 802 may include one or more intermediate points between the starting point 804A and the ending point 804B.

Figure 9:
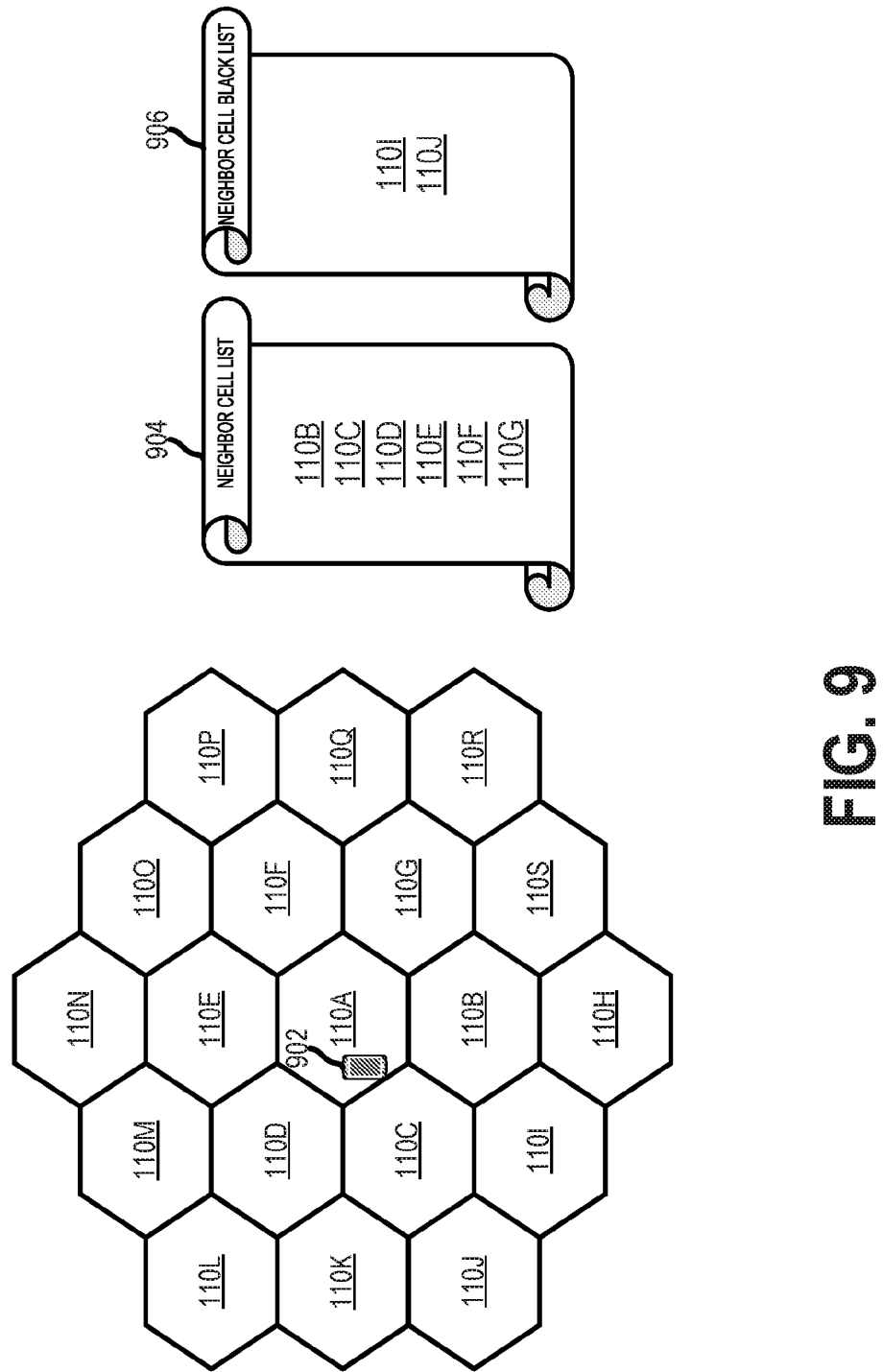
FIG. 9 illustrates an example of a neighbor cell list and a neighbor cell black list for ground user equipment according to one embodiment.

At operation 704, one or more cell lists may be generated based on the flight plan information received at operation 702. As will be described below, the one or more cell lists may be used for performing a handover procedure such that the UAV 104 may move between cells 110 without losing network access. In one embodiment, the one or more cell lists may include a neighbor cell list that indicates a first set of cells 110 in a wireless network (e.g., GERAN 108A, U IRAN 108B, or E-UTRAN 108C). In this embodiment, the UAV 104 is to record and report, to a source cell 110, to which the UAV 104 is currently connected, radio measurement information describing signals from the first set of cells 110 that are detected by the UAV 104. In some embodiments, the first set of cells 110 provide wireless network coverage along the flight path 802 of the UAV 104. In these embodiments, the first set of cells 110 provide wireless coverage along parts of the flight path 802 that will be traversed by the UAV 104. When a ground based piece of user equipment is used, a neighbor cell list includes all cells 110 proximate to the piece of user equipment. For example, FIG. 9 shows a piece of ground based user equipment 902 (e.g., a cellular phone) and a set of cells 110A-110S. In this example, a neighbor cell list 904 includes all cells 110 that are proximate to the piece of ground based user equipment 902 (excluding the source cell 110A that the user equipment 902 is currently connected). In particular, the neighbor cell list 904 includes the cells 110B-110G.

Figure 10:
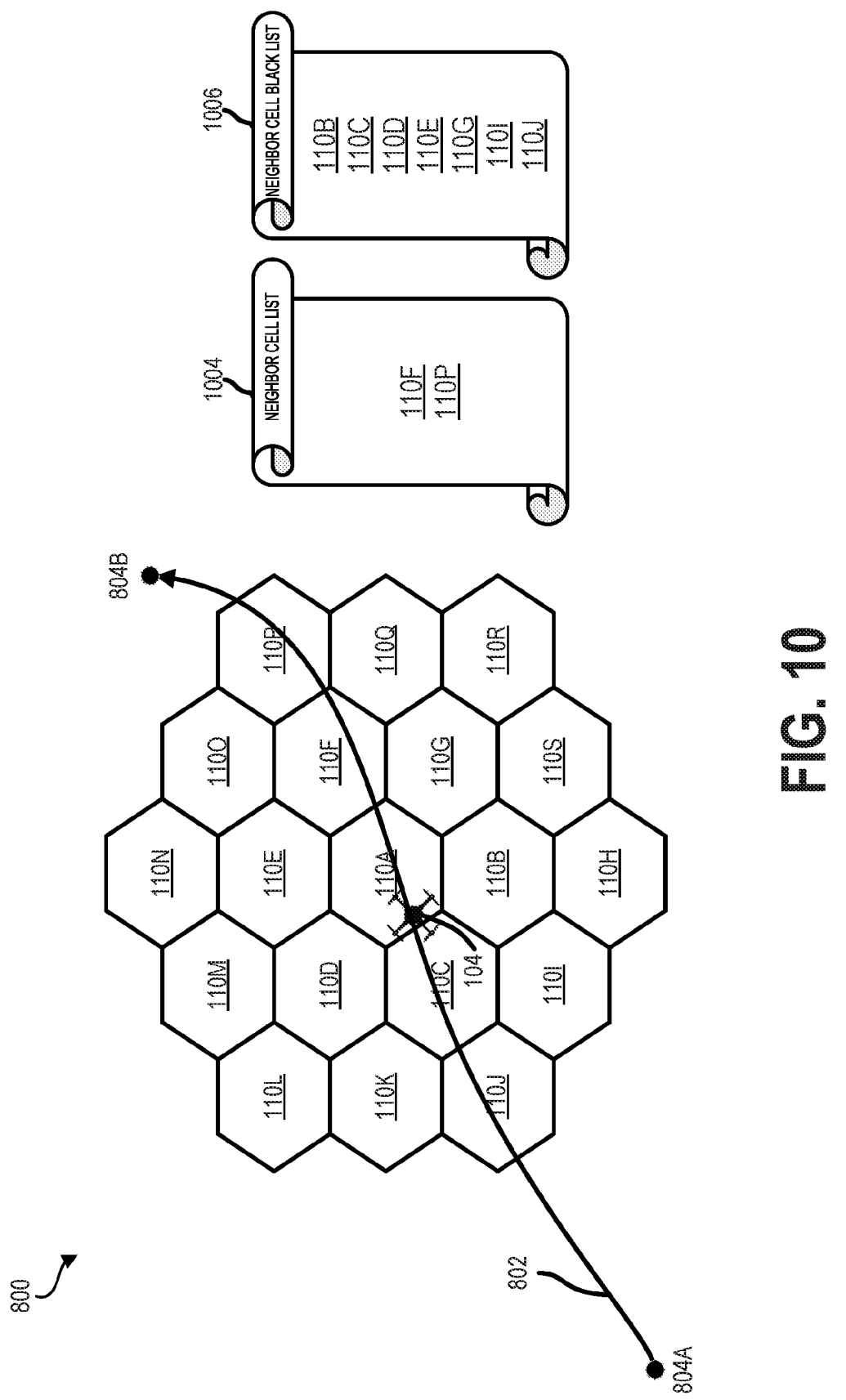
FIG. 10 illustrates an example of a neighbor cell list and a neighbor cell black list for a UAV flying at a first altitude according to one embodiment.

In comparison, FIG. 10 shows a UAV 104 and the set of cells 110A-110S. In this example, a neighbor cell list 1004 includes only those cells 110 that are neighboring the source/serving cell 110A and are along the future portion of the flight path 802 of the UAV 104. In particular, the neighbor cell list 1004 includes the cells 110F and 110P as these are the only cells 110 in which the flight path 802 will traverse in the future based on the current position of the UAV 104 along the flight path 802. Although FIG. 10 is shown in relation to two-dimensions, in one embodiment, the first set of cells 110 of the neighbor cell list 1004 provide network coverage to the UAV 104 based on an altitude of the UAV 104 indicated in the flight plan information. In some embodiments, the neighbor cell list generated at operation 704 may include intra-frequency neighbor cells 110 (i.e., cells 110 operating using the same carrier frequency), inter-frequency neighbor cells 110 (i.e., cells 110 operating using different carrier frequencies), or inter-Radio Access Technology (RAT) cells 110 (i.e., cells 110 using different radio access technologies). In this fashion, a neighbor cell 110 may be a macro-cell, a micro-cell, a pico-cell, or a satellite cell covered by a satellite spot beam.

In some embodiments, the one or more cell lists generated at operation 704 includes a neighbor cell black list that indicates a second set of cells 110 in the wireless network that the UAV 104 is to ignore while recording radio measurement information. In one embodiment, the second set of cells 110 provide wireless network coverage to areas outside the flight path 802 of the UAV 104. In some embodiments, the second set of cells 110 are cells that are selected for handover procedures in the wireless network below a threshold rate of selection and/or the second set of cells 110 are cells that successfully complete handover procedures in the wireless network below a threshold rate of completion.

Returning to FIG. 9, a neighbor cell black list for a piece of ground based user equipment 902 is generated without an understanding of the expected path of the piece of user equipment 902 as this information is unknown. In particular, only cells 110I and 110J are listed in the neighbor cell black list 906. In one embodiment, these cells 110I and 110J may have been included in the neighbor cell black list 906 as they are historically selected for handover procedures in the wireless network below a threshold rate of selection and/or the second set of cells 110 are cells that successfully complete handover procedures in the wireless network below a threshold rate of completion. In comparison, the neighbor cell black list 1006 for the UAV 104 shown in FIG. 10 includes cells 110 that are not along the future flight path 802 of the UAV 104.

Figure 11:
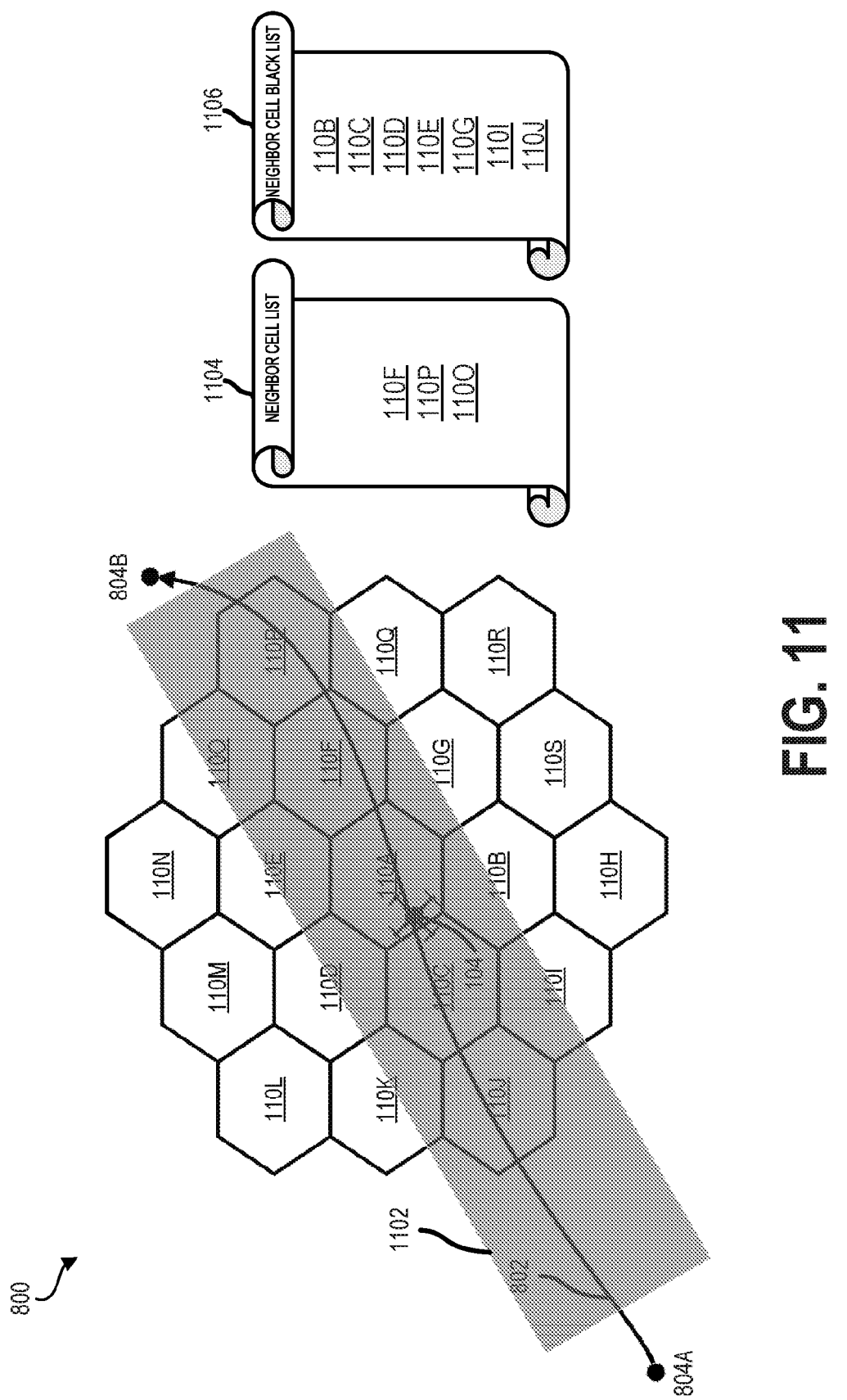
FIG. 11 illustrates an example of a neighbor cell list and a neighbor cell black list for a UAV flying at a second altitude according to one embodiment.

In some embodiments, the one or more cell lists may be associated with an altitude or an altitude range. For example, the neighbor cell list 1004 of FIG. 10 may be associated with an altitude between 1.5 meters and 15 meters. In contrast, the neighbor cell list 1104 of FIG. 11 may be for UAVs 104 with an altitude between 15 meters and 120 meters. Since the UAV 104 of FIG. 11 is flying within the corridor 1102 that corresponds to the altitude range between 15 meters and 120 meters, which is higher that the altitude range of the UAV 104 of FIG. 10, the UAV 104 may see additional cells 110 in the direction of its flight path 802, which provides a network coverage at the higher altitude. In particular, cell 110O is added to the neighbor cell list 1104 (relative to the neighbor cell list 1004 of FIG. 10) as this cell 110O provides coverage at the altitude the UAV 104 is scheduled to fly.

In one embodiment, cells 110 may be added and removed from the one or more cell lists as the UAV 104 progresses through a flight path. For example, after the UAV 104 passes the cell 110F along the flight path 802, the cell 110F may be removed from the neighbor cell list 1104 and added to the neighbor cell black list 1106.

At operation 706 the one or more cell lists may be transmitted to the source cell 110 in a wireless network in which the UAV 104 is currently operating (e.g., GERAN 108A, UTRAN 108B, or E-UTRAN 108C). For instance, in the example of FIG. 10, the one or more cell lists may be transmitted to the source cell 110A. In some embodiments, the one or more cell lists are used in a handover procedure between the source cell 110 that the UAV 104 is currently connected to and a target cell 110 that the UAV 104 will connect to after completing the handover procedure. In one embodiment, the wireless network is a 3rd Generation Partnership Project (3GPP) network (e.g., E-UTRAN 108C). In this embodiment, the one or more cell lists may be generated and transmitted to the source cell 110 by a MME of the wireless network, and the source cell 110 and the target cell 110 are one or more of an enhanced nodeB and a radio base station. Further, in this embodiment, the one or more cell lists are generated using 3GPP Location Services (LCS). In one embodiment, the source cell 110 may transmit the one or more cell lists, or information about the one or more cell lists, to the UAV 104.

At operation 708 radio measurement information that is generated based on the one or more cell lists may be received from the UAV 104, for example, via one or more network nodes. In one embodiment, the UAV 104 may measure and record Reference Signal Received Power (RSRP) or Reference Signal Received Quality (RSRQ) measurements. After the UAV 104 generates the radio measurement information from the cells 110 in the received one or more cell lists (e.g., the first set of cells 110 in the neighbor cell list 1004), the UAV 104 may report the radio measurement information to the source cell 110, which may then forward the radio measurement information to the MME 114E.

At operation 710 the target cell 110 may be selected from the first set of cells 110 of the neighbor cell list for a handover procedure based on the radio measurement information. For example, in the example of FIG. 10, the UAV 104 may be connected to the source/serving cell 110A and the target cell 110 may be selected at operation 710 to be the cell 110F. In this example, the neighbor cell list 1004, from which the target cell 110 is selected, includes the cells 110F and 110P as these cells 110 are along the flight path 802 of the UAV 104. Further, the radio measurement information received at operation 708 associated with the cell 110F exceeds a set of thresholds and is higher than radio measurement information associated with the cell 110P. Accordingly, the cell 110F is selected as the target cell 110 at operation 710 for the handover procedure.

At operation 712 the handover procedure may be caused to be performed with the target cell 110 selected at operation 710 (e.g., the cell 110F). Performance of the handover procedure may include causing the UAV 104 to disconnect from the source cell 110 (e.g., the cell 110A) and connect with the target cell 110 (e.g., the cell 110F). For example, the MME 114E may communicate with one or more of the source cell 110A, the target cell 110F, and the UAV 104 to instruct performance of the handover procedure. In one embodiment, the handover procedure is performed in response to the radio measurement information associated with the source cell 110 (e.g., cell 110A) being below a set of thresholds.

With an optimized set of one or more cell lists, including a neighbor cell list and/or neighbor cell black list, the systems and methods provided herein allow a UAV 104 to more easily identify a suitable target cell 110 for handover. Specifically, utilizing an optimized neighbor cell list and/or neighbor cell black list will result in a smaller list of cells 110 that a UAV 104 needs to measure, compared to non-optimized lists. A smaller measurement list is advantageous for several reasons, including (1) less measurements needed that results in reduced UAV 104 power consumption and signaling for sending back measurement results to the network and (2) given a measurement period, the UAV 104 can perform more smoothing and averaging on each neighbor cell 110, which improves measurement accuracy.

Figure 12:
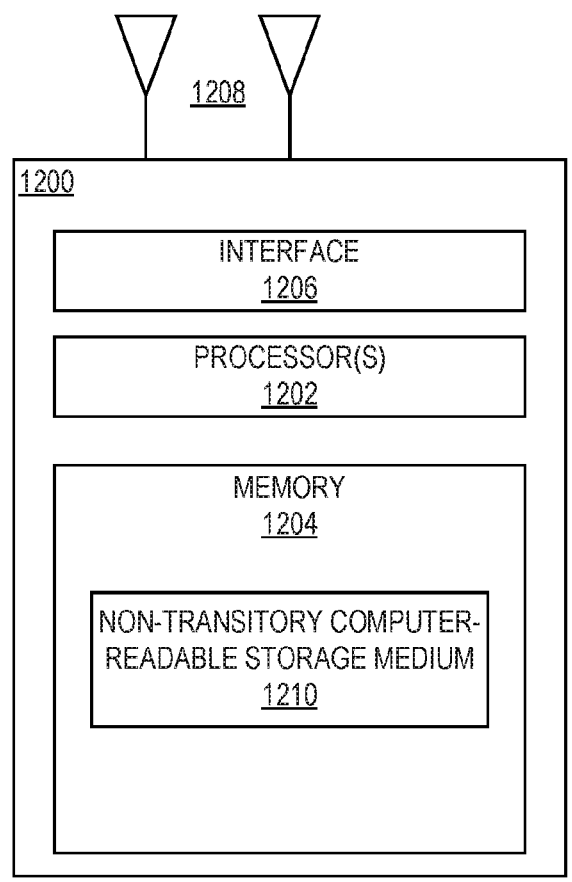
FIG. 12 illustrates a computing/networking device according to one embodiment.

Each element of the systems described herein may be composed of or otherwise implemented by a set of computing/networking devices. For example, FIG. 12 illustrates a computing/networking device 1200 according to one embodiment. As shown, the computing/networking device 1200 may include a processor 1202 communicatively coupled to a memory 1204 and an interface 1206. The processor 1202 may be a microprocessor, controller, microcontroller, central processing unit, digital signal processor, application specific integrated circuit, field programmable gate array, any other type of electronic circuitry, or any combination of one or more of the preceding. The processor 1202 may comprise one or more processor cores. In particular embodiments, some or all of the functionality described herein as being provided by a component of the air traffic system may be implemented by one or more processors 1202 of one or more computing/networking devices 1200 executing software instructions, either alone or in conjunction with other computing/networking devices 1200 components, such as the memory 1204.

The memory 1204 may store code (which is composed of software instructions and which is sometimes referred to as computer program code or a computer program) and/or data using non-transitory machine-readable (e.g., computer-readable) media, such as a non-transitory computer-readable storage medium (e.g., magnetic disks, optical disks, solid state drives, read only memory (ROM), flash memory devices, phase change memory) and machine-readable transmission media (e.g., electrical, optical, radio, acoustical or other form of propagated signals—such as carrier waves, infrared signals). For instance, the memory 1204 may comprise non-volatile memory (e.g., a non-transitory computer-readable storage medium 1210) containing code to be executed by the processor 1202. Where the memory 1204 is non-volatile, the code and/or data stored therein can persist even when the computing/networking device 1200 is turned off (when power is removed). In some instances, while the computing/networking device 1200 is turned on, that part of the code that is to be executed by the processor(s) 1202 may be copied from non-volatile memory into volatile memory (e.g., dynamic random access memory (DRAM), static random access memory (SRAM)) of the computing/networking device 1200.

The interface 1206 may be used in the wired and/or wireless communication of signaling and/or data to or from computing/networking device 1200. For example, interface 1206 may perform any formatting, coding, or translating to allow computing/networking device 1200 to send and receive data whether over a wired and/or a wireless connection. In some embodiments, the interface 1206 may comprise radio circuitry capable of receiving data from other devices in the network over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via the antennas 1208 to the appropriate recipient(s). In some embodiments, interface 1206 may comprise network interface controller(s) (NICs), also known as a network interface card, network adapter, local area network (LAN) adapter or physical network interface. The NIC(s) may facilitate in connecting the computing/networking device 1200 to other devices allowing them to communicate via wire through plugging in a cable to a physical port connected to a NIC. In particular embodiments, the processor 1202 may represent part of the interface 1206, and some or all of the functionality described as being provided by the interface 1206 may be provided in part or in whole by the processor 1202.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Additionally, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for managing an unmanned aerial vehicle (UAV), comprising:

receiving flight plan information describing a flight path of the UAV;

generating one or more cell lists based on the flight plan information; and transmitting the one or more cell lists to a source cell in a wireless network in which the UAV is currently operating, wherein the one or more cell lists are used in a handover procedure between the source cell that the UAV is currently connected to and a target cell that the UAV will connect to after completing the handover procedure, and wherein the one or more cell lists include a neighbor cell black list that includes unique identifiers of a first set of cells in the wireless network that the UAV is to ignore while recording radio measurement information, and wherein the neighbor cell black list includes cells that are historically selected for handovers in the wireless network below a threshold rate of selection.

2. The method of claim 1, wherein the one or more cell lists include a neighbor cell list that indicates a second set of cells, wherein the UAV is to record and report, to the source cell, radio measurement information describing signals from the second set of cells that are detected by the UAV.

3. The method of claim 2, wherein the second set of cells provide wireless network coverage along the flight path of the UAV.

4. The method of claim 3, wherein the second set of cells provide wireless coverage along parts of the flight path that will be traversed by the UAV.

5. The method of claim 3, wherein the second set of cells provide network coverage to the UAV based on an altitude of the UAV indicated in the flight plan information.

6. The method of claim 3, further comprising:
receiving, from the UAV, the radio measurement information that is generated based on the one or more cell lists;
selecting the target cell from the second set of cells based on the radio measurement information; and
causing performance of the handover procedure with the target cell, including causing the UAV to disconnect from the source cell and connect with the target cell.

7. The method of claim 1, wherein the first set of cells provide wireless network coverage to areas outside the flight path of the UAV.

8. The method of claim 1, wherein the flight plan information that describes the flight path of the UAV was approved by a UAV Traffic Management (UTM) system.

9. The method of claim 1, wherein the flight plan information includes altitude information.

10. The method of claim 1, wherein the wireless network is a 3rd Generation Partnership Project (3GPP) network.

11. The method of claim 9, wherein the source cell and the target cell are one or more of an enhanced nodeB and a radio base station.

12. The method of claim 10, wherein a Mobility Management Entity (MME) generates the one or more cell lists.

13. The method of claim 9, wherein the one or more cell lists are generated using 3GPP Location Services (LCS).

14. A non-transitory computer-readable storage medium storing instructions which, when executed by a set of one or more processors of a computing device, cause the computing device to:
receive flight plan information describing a flight path of an unmanned aerial vehicle (UAV);
generate one or more cell lists based on the flight plan information; and
transmit the one or more cell lists to a source cell in a wireless network in which the UAV is currently operating,
wherein the one or more cell lists are used in a handover procedure between the source cell that the UAV is currently connected to and a target cell that the UAV will connect to after completing the handover procedure,
wherein the one or more cell lists include a neighbor cell black list that includes unique identifiers of a first set of cells in the wireless network that the UAV is to ignore while recording radio measurement information, and
wherein the neighbor cell black list includes cells that are historically selected for handovers in the wireless network below a threshold rate of selection.

15. The non-transitory computer-readable storage medium of claim 14, wherein the first set of cells provide wireless network coverage to areas outside the flight path of the UAV.

16. The non-transitory computer-readable storage medium of claim 14, wherein the one or more cell lists include a neighbor cell list that indicates a second set of cells, wherein the UAV is to record and report, to the source cell, radio measurement information describing signals from the second set of cells that are detected by the UAV.

17. The non-transitory computer-readable storage medium of claim 14, wherein the wireless network is a 3rd Generation Partnership Project (3GPP) network.

18. A network device for managing an unmanned aerial vehicle (UAV), comprising:
a processing circuitry;
a memory coupled to the processing circuitry, wherein the memory includes one or more instructions that, when executed by the processing circuitry, cause the network device to:
receive flight plan information describing a flight path of the UAV;
generate one or more cell lists based on the flight plan information; and
transmit the one or more cell lists to a source cell in a wireless network in which the UAV is currently operating,
wherein the one or more cell lists are used in a handover procedure between the source cell that the UAV is currently connected to and a target cell that the UAV will connect to after completing the handover procedure,
wherein the one or more cell lists include a neighbor cell black list that includes unique identifiers of a first set of cells in the wireless network that the UAV is to ignore while recording radio measurement information, and
wherein the neighbor cell black list includes cells that are that are historically selected for handovers in the wireless network below a threshold rate of selection.

19. The network device of claim 18, wherein the one or more cell lists include a neighbor cell list that indicates a second set of cells, wherein the UAV is to record and report, to the source cell, radio measurement information describing signals from the second set of cells that are detected by the UAV.

20. The network device of claim 18, wherein the first set of cells provide wireless network coverage to areas outside the flight path of the UAV.

21. The network device of claim 18, wherein the wireless network is a 3rd Generation Partnership Project (3GPP) network.

* * * * *